(12) United States Patent
Yamanaka et al.

(10) Patent No.: US 12,297,339 B2
(45) Date of Patent: May 13, 2025

(54) METHOD FOR PRODUCING LIQUID DISPERSION OF COMPOSITE RESIN PARTICLES, METHOD FOR PRODUCING PRESSURE-SENSITIVE ADHESIVE, METHOD FOR PRODUCING PRESSURE-RESPONSIVE RESIN, METHOD FOR PRODUCING TONER FOR DEVELOPING ELECTROSTATIC CHARGE IMAGE, AND LIQUID DISPERSION OF COMPOSITE RESIN PARTICLES

(71) Applicant: FUJIFILM Business Innovation Corp., Tokyo (JP)

(72) Inventors: Kiyohiro Yamanaka, Kanagawa (JP);
Yasunobu Kashima, Kanagawa (JP);
Sumiaki Yamasaki, Kanagawa (JP);
Takahiro Ishizuka, Kanagawa (JP);
Satoshi Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 806 days.

(21) Appl. No.: 17/503,529

(22) Filed: Oct. 18, 2021

(65) Prior Publication Data

US 2022/0306852 A1  Sep. 29, 2022

(30) Foreign Application Priority Data

Mar. 24, 2021  (JP) .................................. 2021-050365

(51) Int. Cl.
*C08L 25/14*  (2006.01)
*C08F 212/08*  (2006.01)
(Continued)

(52) U.S. Cl.
CPC ............ *C08L 25/14* (2013.01); *C08F 212/08* (2013.01); *C09J 125/14* (2013.01); *G03G 9/08711* (2013.01); *C08L 2201/54* (2013.01)

(58) Field of Classification Search
CPC .... C08L 25/14; C08L 2201/54; C08F 212/08; C09J 125/14; G03G 9/08711; G03G 2215/00835; G03G 9/0804; C09D 11/02
See application file for complete search history.

(56) References Cited

U.S. PATENT DOCUMENTS 5,217,836 A  6/1993  Takiguchi et al.
9,904,192 B2  2/2018  Ohta
(Continued)

FOREIGN PATENT DOCUMENTS

JP  2018-053220 A  4/2018
JP  2021-017465 A  2/2021

OTHER PUBLICATIONS

Extended European Search Report dated May 20, 2022 in European Application No. 21211592.7.
(Continued)

*Primary Examiner* — Sandra Brase
(74) *Attorney, Agent, or Firm* — Sughrue Mion, PLLC

(57) ABSTRACT

A method for producing a liquid dispersion of composite resin particles includes polymerizing a styrene compound and an extra vinyl monomer together to give a styrene resin; polymerizing a (meth)acrylate compound in the presence of the styrene resin to give intermediate resin particles A, which are resin particles containing the styrene resin and a (meth)acrylate resin; polymerizing a styrene compound and an extra vinyl monomer in the presence of intermediate resin particles A to give liquid dispersion B, which is a liquid dispersion containing intermediate resin particles B; and adding a polymerization initiator to liquid dispersion B to give a liquid dispersion containing composite resin particles.

(Continued)

In the composite resin particles as a whole, the ratio by mass between the styrene and (meth)acrylate resins is between 80:20 and 20:80. There is a difference of 30° C. or more between the lowest and highest glass transition temperatures of the composite resin particles.

14 Claims, 3 Drawing Sheets

(51) Int. Cl.
*C09J 125/14* (2006.01)
*G03G 9/087* (2006.01)

(56) References Cited

U.S. PATENT DOCUMENTS

| | | | |
|---|---|---|---|
| 2009/0053631 A1* | 2/2009 | Matsumura | G03G 15/2092 430/48 |
| 2018/0001687 A1* | 1/2018 | Uehara | B29C 65/486 |
| 2019/0292412 A1 | 9/2019 | Yamasaki et al. | |
| 2020/0310307 A1* | 10/2020 | Yawada | G03G 9/08711 |
| 2021/0017424 A1 | 1/2021 | Ishizuka et al. | |

OTHER PUBLICATIONS

Communication dated Mar. 4, 2025 in Japanese Application No. 2021-050365.

* cited by examiner

METHOD FOR PRODUCING LIQUID DISPERSION OF COMPOSITE RESIN PARTICLES, METHOD FOR PRODUCING PRESSURE-SENSITIVE ADHESIVE, METHOD FOR PRODUCING PRESSURE-RESPONSIVE RESIN, METHOD FOR PRODUCING TONER FOR DEVELOPING ELECTROSTATIC CHARGE IMAGE, AND LIQUID DISPERSION OF COMPOSITE RESIN PARTICLES

CROSS-REFERENCE TO RELATED APPLICATIONS

This application is based on and claims priority under 35 USC 119 from Japanese Patent Application No. 2021-050365 filed Mar. 24, 2021.

BACKGROUND

(i) Technical Field

The present disclosure relates to a method for producing a liquid dispersion of composite resin particles, a method for producing a pressure-sensitive adhesive, a method for producing a pressure-responsive resin, a method for producing a toner for developing an electrostatic charge image, and a liquid dispersion of composite resin particles.

(ii) Related Art

Japanese Unexamined Patent Application Publication No. 2018-053220 discloses a releasable sheet, a sheet having a sticking surface part of which can be attached to another, or that can be attached to the sticking surface of another, and then separated again. The releasable sheet includes a substrate sheet, a pressure-sensitive adhesive layer on at least one side of the substrate sheet, and a surface layer on the surface of the pressure-sensitive adhesive layer. The surface layer contains one or more selected from the group consisting of cellulose nanofibers, chitin nanofibers, and chitosan nanofibers.

Japanese Unexamined Patent Application Publication No. 2021-017465 describes an adhesive material containing resin particles that contain a styrene resin and a (meth)acrylate resin. The styrene resin is polymerized from monomers including styrene and another vinyl monomer. The (meth)acrylate resin is polymerized from monomers including at least two (meth)acrylates, with the percentage by mass of (meth)acrylates to all monomers being 90% by mass or more. The ratio by mass between the styrene and (meth)acrylate resins is between 80:20 and 20:80. The resin particles have at least two glass transition temperatures, the lowest of which is −30° C. or below, with the highest being 30° C. or above.

SUMMARY

Aspects of non-limiting embodiments of the present disclosure relate to a method for producing a liquid dispersion of composite resin particles, the method including polymerizing a styrene compound and an extra vinyl monomer to give a styrene resin; polymerizing a (meth)acrylate compound in the presence of the styrene resin to give intermediate resin particles A, which are resin particles containing the styrene resin and a (meth)acrylate resin; polymerizing a styrene compound and an extra vinyl monomer in the presence of intermediate resin particles A to give liquid dispersion B, which is a liquid dispersion containing intermediate resin particles B. In this method, the resulting liquid dispersion may be more adhesive when pressure-bonded and more stable when stored than would without adding a polymerization initiator. The residual monomer content, furthermore, may be smaller.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a liquid dispersion of composite resin particles, the method including polymerizing a styrene compound and an extra vinyl monomer to give a styrene resin; polymerizing a (meth)acrylate compound in the presence of the styrene resin to give intermediate resin particles A, which are resin particles containing the styrene resin and a (meth)acrylate resin; polymerizing a styrene compound and an extra vinyl monomer in the presence of intermediate resin particles A to give liquid dispersion B, which is a liquid dispersion containing intermediate resin particles B; and adding a polymerization initiator to liquid dispersion B to give a liquid dispersion containing composite resin particles. In the composite resin particles as a whole, a ratio by mass between the styrene and (meth)acrylate resins is between 80:20 and 20:80. There is a difference of 30° C. or more between lowest and highest glass transition temperatures of the composite resin particles.

BRIEF DESCRIPTION OF THE DRAWINGS

Exemplary embodiments of the present disclosure will be described in detail based on the following figures, wherein.

DETAILED DESCRIPTION

Figure 1:
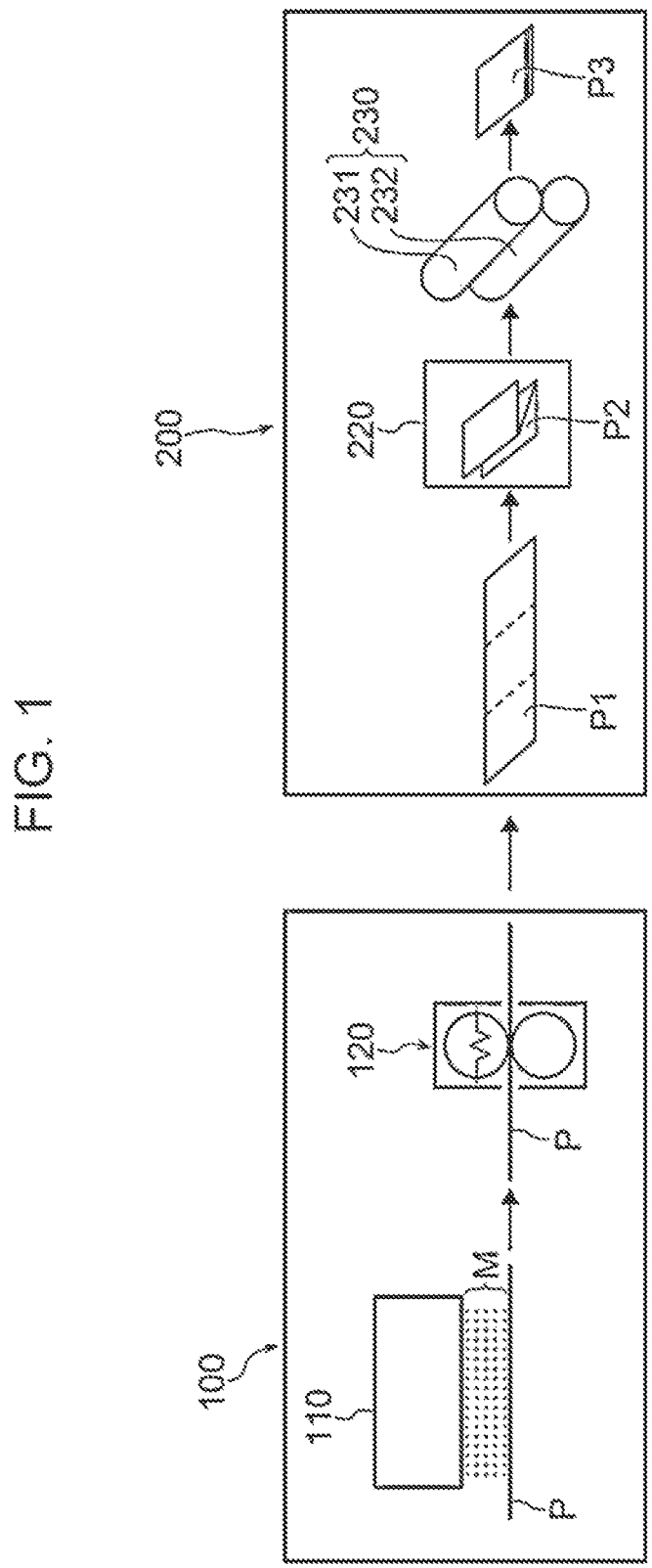
FIG. 1 is a schematic diagram illustrating an example of an apparatus according to an exemplary embodiment for producing printed matter.

The following describes exemplary embodiments. The following description and Examples are merely examples of the embodiments and do not limit the scope of the embodiments.

In the exemplary embodiments, numerical ranges specified with "A-B," "between A and B," "(from) A to B," etc., represent inclusive ranges, which include the minimum A and the maximum B as well as all values in between.

The exemplary embodiments may also mention series of numerical ranges. In such a series, the upper or lower limit of a numerical range may be substituted with that of another in the same series. The upper or lower limit of a numerical range, furthermore, may be substituted with a value indicated in the Examples section.

In the exemplary embodiments, a gerund or action noun used in relation to a certain process or method does not always represent an independent action. As long as its purpose is fulfilled, the action represented by the gerund or action noun may be continuous with or part of another.

The exemplary embodiments may include one(s) described with reference to drawing(s). The reference, however, does not mean that what is illustrated is the only possible configuration of the exemplary embodiment. The size of elements in each drawing is conceptual; the relative sizes of the elements do not need to be as illustrated.

In the exemplary embodiments, an ingredient may be a combination of multiple substances. If a composition described in an exemplary embodiment contains a combination of multiple substances as one of its ingredients, the amount of the ingredient represents the total amount of the substances in the composition unless stated otherwise.

In the exemplary embodiments, furthermore, an ingredient may be a combination of multiple kinds of particles. If a composition described in an exemplary embodiment contains a combination of multiple kinds of particles as one of its ingredients, the diameter of particles of the ingredient is that of the mixture of the multiple kinds of particles present in the composition.

In the exemplary embodiments, the expression "(meth) acrylic" means the compound may be either "acrylic" or "methacrylic." A "(meth)acrylate," likewise, may be either an acrylate or methacrylate.

In the exemplary embodiments, "toner for developing an electrostatic charge image" may be referred to simply as "toner." "An electrostatic charge image developer" may be referred to simply as "a developer."

In the exemplary embodiments, printed matter formed by folding a recording medium or stacking two or more recording media and then sticking together surfaces facing one another is referred to as "pressure-bonded printed matter."

Method for Producing a Liquid Dispersion of Composite Resin Particles

A method according to an exemplary embodiment for producing a liquid dispersion of composite resin particles includes polymerizing at least one styrene compound and at least one extra vinyl monomer to give a styrene resin (polymerization A); polymerizing at least one (meth)acrylate compound in the presence of the styrene resin to give intermediate resin particles A, which are resin particles containing the styrene resin and a (meth)acrylate resin (polymerization B); polymerizing at least one styrene compound and at least one extra vinyl monomer in the presence of intermediate resin particles A to give liquid dispersion B, which is a liquid dispersion containing intermediate resin particles B (polymerization C); and adding a polymerization initiator to liquid dispersion B to give a liquid dispersion containing composite resin particles (addition of initiator). In the composite resin particles as a whole, the ratio by mass between the styrene and (meth)acrylate resins is between 80:20 and 20:80. There is a difference of 30° C. or more between the lowest and highest glass transition temperatures of the composite resin particles.

Simply polymerizing monomers including styrene and another vinyl monomer into a styrene resin by emulsion polymerization and then polymerizing at least a (meth) acrylate by adding it dropwise will also give a liquid dispersion of composite resin particles with a 30° C. difference between the lowest and highest glass transition temperatures. In that case, however, the resulting composite resin particles tend to contain residual monomers inside, even after the end of polymerization, because after the first polymerization, the resin particles are made to absorb monomers for the second polymerization.

To address this, the method according to this exemplary embodiment for producing a liquid dispersion of composite resin particles includes adding a polymerization initiator to aforementioned liquid dispersion B to give a liquid dispersion containing composite resin particles. This may help promote the polymerization of residual monomers, thereby helping lessen environmental burdens such monomers can place when the liquid dispersion is applied and dried. Besides this, the resulting liquid dispersion, the inventors believe, may be highly adhesive and stable when stored.

The following describes the method according to this exemplary embodiment for producing a liquid dispersion of composite resin particles in detail. In the following description, "a styrene resin" represents "a styrene resin polymerized from monomer(s) including a styrene compound with the percentage of the styrene compound being 50% by mass or more," and "a (meth)acrylate resin" represents "a (meth) acrylate resin polymerized from monomer(s) including a (meth)acrylic compound with the percentage of the (meth) acrylic compound being 50% by mass or more" unless stated otherwise.

The (meth)acrylic compound can be any compound that has (meth)acrylic group(s). Examples include (meth)acrylate compounds, (meth)acrylamide compounds, (meth) acrylic acid, and (meth)acrylonitrile.

In the method according to this exemplary embodiment for producing a liquid dispersion of composite resin particles, the ratio by mass between the styrene and (meth) acrylate resins in the composite resin particles as a whole is between 80:20 and 20:80. This ratio may be between 70:30 and 30:70; this may help make the liquid dispersion adhesive when pressure-bonded and stable when stored. In that case, furthermore, surfaces stuck together with the liquid dispersion will separate without being torn even after storage (hereinafter described as being tearproof after storage). Preferably, this ratio is between 60:40 and 40:60.

It should be noted that the composite resin particles contain two styrene resins, one from polymerization A and one from polymerization C.

In the method according to this exemplary embodiment for producing a liquid dispersion of composite resin particles, there is a difference of 30° C. or more between the lowest and highest glass transition temperatures of the resulting composite resin particles. This difference may be 40° C. or more; this may help make the liquid dispersion adhesive when pressure-bonded, stable when stored, and tearproof after storage. Preferably, this difference is 60° C. or more, more preferably 60° C. or more and 200° C. or less, in particular 80° C. or more and 150° C. or less.

The lowest glass transition temperature of the composite resin particles may be that of the (meth)acrylate resin.

The highest glass transition temperature of the composite resin particles may be that of one of the styrene resins. Preferably, the lowest glass transition temperature of the composite resin particles is that of the (meth)acrylate resin, with the highest being that of one of the styrene resins.

As mentioned herein, the glass transition temperature of a resin is that determined from the DSC curve of the resin, which is measured by differential scanning calorimetry (DSC). More specifically, the glass transition temperature is the "extrapolated initial temperature of glass transition" as in the methods for determining glass transition temperatures set forth in JIS K7121: 1987 "Testing Methods for Transition Temperatures of Plastics."

In the method according to this exemplary embodiment for producing a liquid dispersion of composite resin particles, the resulting composite resin particles may contain one of the styrene resins and the (meth)acrylate resin inside while having the other styrene resin on their surface.

The composite resin particles may contain 90% by mass or more of the (meth)acrylate resin inside; this may help make the liquid dispersion adhesive when pressure-bonded, stable when stored, and tearproof after storage. Preferably, 95% by mass or more, more preferably 99% by mass or more, of the (meth)acrylate resin is inside the composite resin particles.

The residual monomer content of the composite resin particles may be 1,200 ppm or less; this may help make the liquid dispersion adhesive when pressure-bonded, stable when stored, and tearproof after storage. Preferably, the residual monomer content is 800 ppm or less, more preferably 500 ppm or less.

Polymerization A

The method according to this exemplary embodiment for producing a liquid dispersion of composite resin particles includes polymerizing at least one styrene compound and at least one extra vinyl monomer to give a styrene resin (polymerization A).

It is not critical how to polymerize the monomers. The monomers may be polymerized by emulsion polymerization.

Emulsion polymerization, indeed, may be used throughout the method according to this exemplary embodiment for producing a liquid dispersion of composite resin particles.

Polymerization A may include preparing particles of the styrene resin. Preferably, polymerization A includes preparing a liquid dispersion of particles of the styrene resin.

The dispersion of particles of the styrene resin in a dispersion medium can be achieved by, for example, mixing the styrene resin and the dispersion medium together and then stirring the mixture using equipment such as a rotary-shear homogenizer or a ball mill, sand mill, Dyno-Mill, or other medium mill.

Alternatively, emulsion polymerization may be used. Specifically, mixing the starting monomers for the styrene resin with a chain transfer agent or polymerization initiator, adding an aqueous medium containing a surfactant, stirring the mixture to give an emulsion, and then polymerizing the monomers in the emulsion will give a liquid dispersion of particles of the styrene resin. The chain transfer agent, if used, may be a thiol compound. Preferably, the chain transfer agent is dodecanethiol.

Examples of dispersion media include aqueous media, such as water and alcohols. One of these may be used alone, or two or more may be used in combination.

Examples of surfactants include anionic surfactants, such as sulfates, sulfonates, phosphates, and soap surfactants; cationic surfactants, such as amine salts and quaternary ammonium salts; and nonionic surfactants, such as polyethylene glycol surfactants, ethylene oxide adducts of alkylphenols, and polyhydric alcohols. A combination of a nonionic surfactant with an anionic or cationic surfactant may also be used. Of these, anionic surfactants are preferred. One surfactant may be used alone, or two or more may be used in combination.

The polymerization initiator can be of any kind. Known photoinitiators and thermal initiators can be used.

Thermal initiators are preferred, and peroxides are more preferred. It is even more preferred that the polymerization initiator be a persulfate compound, in particular ammonium persulfate.

The temperature and duration of polymerization are not critical and are at the manufacturer's discretion. The monomers and initiator used, for example, are factors to consider.

The styrene compound used in polymerization A may include styrene.

In polymerization A, the percentage by mass of styrene to all monomers in the resulting styrene resin may be 60% by mass or more; this may help prevent the composite resin particles from flowing without applied pressure. Preferably, this percentage is 65% by mass or more, more preferably 70% by mass or more. The percentage of styrene may be 95% by mass or less; this may help ensure the composite resin particles will easily undergo a phase transition when exposed to pressure. Preferably, the percentage of styrene is 90% by mass or less, more preferably 85% by mass or less.

Apart from styrene, examples of styrene compounds that can be used in polymerization A include vinylnaphthalene; alkylstyrenes, such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; arylstyrenes, such as p-phenylstyrene; alkoxystyrenes, such as p-methoxystyrene; halostyrenes, such as p-chlorostyerene, 3,4-dichlorostyrene, p-fluorostyrene, and 2,5-difluorostyrene; and nitrostyrenes, such as m-nitrostyrene, o-nitrostyrene, and p-nitrostyrene. One styrene compound may be used alone, or two or more may be used in combination.

Besides the styrene compound, polymerization A involves at least one extra vinyl monomer as a building block for the styrene resin. An example is at least one acrylic monomer.

The acrylic monomer, if used, in polymerization A may be at least one selected from the group consisting of (meth)acrylic acid and (meth)acrylate compounds. Examples of (meth)acrylate compounds include alkyl (meth)acrylate compounds, carboxyalkyl (meth)acrylate compounds, hydroxyalkyl (meth)acrylate compounds, alkoxyalkyl (meth)acrylate compounds, and di(meth)acrylate compounds. One acrylic monomer may be used alone, or two or more may be used in combination.

Examples of alkyl (meth)acrylate compounds include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of carboxyalkyl (meth)acrylate compounds include 2-carboxyethyl (meth)acrylate.

Examples of hydroxyalkyl (meth)acrylate compounds include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of alkoxyalkyl (meth)acrylate compounds include 2-methoxyethyl (meth)acrylate.

Examples of di(meth)acrylate compounds include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

(Meth)acrylates like 2-(diethylamino)ethyl (meth)acrylate, benzyl (meth)acrylate, and methoxypolyethylene glycol (meth)acrylate are also examples of (meth)acrylate compounds that can be used.

Besides these, the following vinyl monomers, for example, may be used as a building block for the styrene resin in polymerization A: (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene.

In polymerization A, the styrene resin may be polymerized from monomers including (meth)acrylate compound(s); this may help ensure the composite resin particles will easily undergo a phase transition when exposed to pressure. Preferably, the monomers include alkyl (meth)acrylate compound(s), more preferably alkyl (meth)acrylate compound(s) having a C2-10 alkyl group, even more preferably alkyl (meth)acrylate compound(s) having a C4-8 alkyl group, in particular at least one of n-butyl acrylate or 2-ethylhexyl acrylate.

In polymerization A, the most abundant, on a % by mass basis, extra vinyl monomer, or the most abundant vinyl monomer excluding the styrene compound, in the resulting styrene resin may be a (meth)acrylate; this may help ensure the composite resin particles will easily undergo a phase transition when exposed to pressure. Preferably, the most abundant extra vinyl monomer is an alkyl (meth)acrylate compound, more preferably an alkyl (meth)acrylate compound having a C2-10 alkyl group, even more preferably n-butyl acrylate or 2-ethylhexyl acrylate.

In polymerization A, furthermore, the percentage by mass of (meth)acrylate compounds to all monomers in the resulting styrene resin may be 40% by mass or less; this may help prevent the composite resin particles from flowing without applied pressure. Preferably, this percentage may be 30% by mass or less, more preferably 25% by mass or less. The percentage of (meth)acrylate compounds may be 5% by mass or more; this may help ensure the composite resin particles will easily undergo a phase transition when exposed to pressure. Preferably, the percentage of (meth)acrylate compounds is 10% by mass or more, more preferably 15% by mass or more. The (meth)acrylate compounds in this context may be alkyl (meth)acrylate compounds. Preferably, the (meth)acrylate compounds are alkyl (meth)acrylate compounds having a C2-10 alkyl group, more preferably alkyl (meth)acrylate compounds having a C4-8 alkyl group.

As stated, in polymerization A, the styrene resin may be polymerized from monomers including at least one of n-butyl acrylate or 2-ethylhexyl acrylate. The combined percentage of n-butyl acrylate and 2-ethylhexyl acrylate to all monomers in the styrene resin may be 40% by mass or less; this may help prevent the composite resin particles from flowing without applied pressure. Preferably, this percentage is 35% by mass or less, more preferably 30% by mass or less. The combined percentage of n-butyl acrylate and 2-ethylhexyl acrylate may be 5% by mass or more; this may help ensure the composite resin particles will easily undergo a phase transition when exposed to pressure. Preferably, the combined percentage of n-butyl acrylate and 2-ethylhexyl acrylate is 10% by mass or more, more preferably 15% by mass or more.

In polymerization A, the weight-average molecular weight of the resulting styrene resin may be 10,000 or more; this may help prevent the composite resin particles from flowing without applied pressure. Preferably, the weight-average molecular weight of the styrene resin is 20,000 or more, more preferably 30,000 or more. The weight-average molecular weight of the styrene resin may be 200,000 or less; this may help ensure the composite resin particles will easily undergo a phase transition when exposed to pressure. Preferably, the weight-average molecular weight of the styrene resin is 150,000 or less, more preferably 100,000 or less.

As mentioned herein, the weight-average molecular weight of a resin is that measured by gel permeation chromatography (GPC) using Tosoh's HLC-8120 GPC chromatograph with Tosoh's TSKgel SuperHM-M column (15 cm) and tetrahydrofuran eluate. A molecular-weight calibration curve constructed using monodisperse polystyrene standards is used to calculate the weight-average molecular weight of the resin.

In polymerization A, furthermore, the glass transition temperature of the resulting styrene resin may be 30° C. or above; this may help prevent the composite resin particles from flowing without applied pressure. Preferably, the glass transition temperature of the styrene resin is 40° C. or above, more preferably 50° C. or above. The glass transition temperature of the styrene resin may be 110° C. or below; this may help ensure the composite resin particles will easily undergo a phase transition when exposed to pressure. Preferably, the glass transition temperature of the styrene resin is 100° C. or below, more preferably 90° C. or below.

In polymerization A, the volume-average diameter of particles of the styrene resin in a liquid dispersion may be 100 nm or more and 250 nm or less. Preferably, this volume-average diameter is 120 nm or more and 220 nm or less, more preferably 150 nm or more and 200 nm or less.

The volume-average diameter of resin particles in a liquid dispersion in this context is that determined by measuring the diameters of the particles using a laser-diffraction particle size distribution analyzer (e.g., HORIBA LA-700). The particle diameter at which the cumulative volume from the smallest diameter is 50% is the volume-average diameter (D50v) of the particles.

Polymerization B

The method according to this exemplary embodiment for producing a liquid dispersion of composite resin particles includes polymerizing at least one (meth)acrylate compound in the presence of the styrene resin obtained in polymerization A to give intermediate resin particles A, which are resin particles containing the styrene resin and a (meth)acrylate resin (polymerization B).

Polymerization B may include preparing a liquid dispersion of intermediate resin particles A (liquid dispersion A).

The dispersion of intermediate resin particles A in a dispersion medium can be achieved by, for example, mixing the resin particles and the dispersion medium together and then mechanically stirring the mixture, for example using a rotary-shear homogenizer or a ball mill, sand mill, Dyno-Mill, or other medium mill.

Alternatively, the starting monomer(s) for the (meth)acrylate resin may be added to a liquid dispersion of the styrene resin, optionally with an aqueous medium. The liquid dispersion is then stirred gently, and at the same time heated to a temperature equal to or higher than the glass transition temperature of the resulting (meth)acrylate resin (e.g., the glass transition temperature of the (meth)acrylate resin plus 10° C. to 30° C.). The dispersion is held at that temperature, an aqueous medium containing a polymerization initiator is added dropwise slowly, and stirring is continued for a long period of time between 1 and 15 hours. The polymerization initiator may be ammonium persulfate.

Examples of dispersion media and polymerization initiators that can be used are the same as in polymerization A.

Polymerization B may involve one or more surfactants. Examples of surfactants that can be used are the same as in polymerization A.

The temperature and duration of polymerization are not critical and are at the manufacturer's discretion. The monomer(s) and initiator used, for example, are factors to consider.

Polymerization B may involve one (meth)acrylate compound or may involve two or more. Preferably, the starting monomers include at least two (meth)acrylates.

In polymerization B, furthermore, the percentage by mass of (meth)acrylates to all monomers in the resulting (meth) acrylate resin may be 90% by mass or more. Preferably, this percentage is 95% by mass or more, more preferably 98% by mass or more, in particular 100% by mass.

Examples of (meth)acrylate compounds that can be used in polymerization B include alkyl (meth)acrylate compounds, carboxyalkyl (meth)acrylate compounds, hydroxyalkyl (meth)acrylate compounds, alkoxyalkyl (meth)acrylate compounds, and di(meth)acrylate compounds.

Examples of alkyl (meth)acrylate compounds include methyl (meth)acrylate, ethyl (meth)acrylate, propyl (meth) acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth) acrylate, cyclohexyl (meth)acrylate, dicyclopentanyl (meth) acrylate, and isobornyl (meth)acrylate.

Examples of carboxyalkyl (meth)acrylate compounds include 2-carboxyethyl (meth)acrylate.

Examples of hydroxyalkyl (meth)acrylate compounds include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of alkoxyalkyl (meth)acrylate compounds include 2-methoxyethyl (meth)acrylate.

Examples of di(meth)acrylate compounds include ethylene glycol di(meth)acrylate, diethylene glycol di(meth)acrylate, triethylene glycol di(meth)acrylate, butanediol di(meth) acrylate, pentanediol di(meth)acrylate, hexanediol di(meth) acrylate, nonanediol di(meth)acrylate, and decanediol di(meth)acrylate.

(Meth)acrylates like 2-(diethylamino)ethyl (meth)acrylate, benzyl (meth)acrylate, and methoxypolyethylene glycol (meth)acrylate are also examples of (meth)acrylate compounds that can be used.

Preferably, polymerization B is performed using alkyl (meth)acrylate compound(s); this may help ensure the composite resin particles will easily undergo a phase transition when exposed to pressure and will be highly adhesive. It is more preferred that the (meth)acrylate(s) be alkyl (meth) acrylate compound(s) having a C2-10 alkyl group, even more preferably alkyl (meth)acrylate compound(s) having a C4-8 alkyl group, in particular n-butyl acrylate and 2-ethylhexyl acrylate.

In polymerizations A and B, furthermore, the starting monomers for the styrene and (meth)acrylate resins may include the same (meth)acrylate compound(s); this may help ensure the composite resin particles will easily undergo a phase transition when exposed to pressure. In other words, the styrene resin produced in polymerization A and the (meth)acrylate resin produced in polymerization B may have repeating unit(s) derived from the same (meth)acrylate compound(s) as this may help ensure the composite resin particles will easily undergo a phase transition when exposed to pressure.

In polymerization B, if the (meth)acrylate resin is polymerized from monomers including at least two (meth)acrylate compounds, the most abundant, on a % by mass basis, two of them may be alkyl (meth)acrylate compounds. The alkyl (meth)acrylate compounds in this context may be those having a C2-10 alkyl group. Alkyl (meth)acrylate compounds having a C4-8 alkyl group are preferred.

If, in polymerization B, the (meth)acrylate resin is polymerized from monomers including at least two (meth)acrylate compounds and if the most abundant, on a % by mass basis, two of them are alkyl (meth)acrylate compounds, the difference between the number of carbon atoms in the alkyl group of one (meth)acrylate compound and that in the alkyl group of the other may be 1 or more and 4 or less; this may help ensure the composite resin particles will easily undergo a phase transition when exposed to pressure and will be highly adhesive. Preferably, this difference is 2 or more and 4 or less, more preferably 3 or 4.

As stated, in polymerization B, the (meth)acrylate resin may be polymerized from monomers including n-butyl acrylate and 2-ethylhexyl acrylate; this may help ensure the composite resin particles will easily undergo a phase transition when exposed to pressure and will be highly adhesive. Preferably, the (meth)acrylate resin is polymerized from monomers including at least two (meth)acrylate compounds, and the most abundant, on a % by mass basis, two of them are n-butyl acrylate and 2-ethylhexyl acrylate. The combined percentage of n-butyl acrylate and 2-ethylhexyl acrylate to all monomers in the (meth)acrylate resin may be 90% by mass or more. Preferably, this percentage is 95% by mass or more, more preferably 98% by mass or more, even more preferably 100% by mass.

In polymerization B, the (meth)acrylate resin may be polymerized from monomers including one or more non-(meth)acrylate vinyl monomers. Examples include (meth) acrylic acid; styrene; styrene monomers excluding styrene; (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene. One of these vinyl monomers may be used alone, or two or more may be used in combination.

If, in polymerization B, the (meth)acrylate resin is polymerized from monomers including non-(meth)acrylate vinyl monomer(s), the non-(meth)acrylate vinyl monomer(s) may be at least one of acrylic acid or methacrylic acid. Preferably, it is acrylic acid.

In polymerization B, the weight-average molecular weight of the resulting (meth)acrylate resin may be 10,000 or more; this may help prevent the composite resin particles from flowing without applied pressure. Preferably, the weight-average molecular weight of the (meth)acrylate resin is 20,000 or more, more preferably 30,000 or more. The weight-average molecular weight of the (meth)acrylate resin may be 200,000 or less; this may help ensure the composite resin particles will easily undergo a phase transition when exposed to pressure. Preferably, the weight-average molecular weight of the (meth)acrylate resin is 150,000 or less, more preferably 100,000 or less.

In polymerization B, furthermore, the glass transition temperature of the resulting (meth)acrylate resin may be 10° C. or below; this may help ensure the composite resin particles will easily undergo a phase transition when exposed to pressure. Preferably, the glass transition temperature of the (meth)acrylate resin is 0° C. or below, more preferably −10° C. or below. The glass transition temperature of the (meth)acrylate resin may be −90° C. or above; this may help prevent the composite resin particles from flowing without applied pressure. Preferably, the glass transition temperature of the (meth)acrylate resin is −80° C. or above, more preferably −70° C. or above.

The volume-average diameter of intermediate resin particles A dispersed in aforementioned liquid dispersion A may be 140 nm or more and 300 nm or less. Preferably, this volume-average diameter is 150 nm or more and 280 nm or less, more preferably 160 nm or more and 250 nm or less.

Polymerization C

The method according to this exemplary embodiment for producing a liquid dispersion of composite resin particles includes polymerizing at least one styrene compound and at least one extra vinyl monomer in the presence of intermediate resin particles A, obtained in polymerization B, to give liquid dispersion B, which is a liquid dispersion containing intermediate resin particles B (polymerization C).

The dispersion of intermediate resin particles B in a dispersion medium can be achieved by, for example, mixing the resin particles and the dispersion medium together and then mechanically stirring the mixture, for example using a rotary-shear homogenizer or a ball mill, sand mill, Dyno-Mill, or other medium mill.

Alternatively, the starting monomers for the styrene resin (group of monomers including at least one styrene compound and at least one extra vinyl monomer) may be added to liquid dispersion A, optionally with an aqueous medium. The liquid dispersion is then stirred gently, and at the same time heated to a temperature equal to or higher than the glass transition temperature of the resulting styrene resin (e.g., the glass transition temperature of the styrene resin plus 10° C. to 30° C.). The dispersion is held at that temperature, an aqueous medium containing a polymerization initiator is added dropwise slowly, and stirring is continued for a long period of time between 1 and 15 hours. The polymerization initiator may be ammonium persulfate.

Examples of dispersion media and polymerization initiators that can be used are the same as in polymerization A.

Polymerization C may involve one or more surfactants. Examples of surfactants that can be used are the same as in polymerization A.

The temperature and duration of polymerization are not critical and are at the manufacturer's discretion. The monomers and initiator used, for example, are factors to consider.

The difference between the temperature for polymerization B and that for polymerization C is not critical either. It may be 10° C. or less; this may help make the liquid dispersion adhesive when pressure-bonded, stable when stored, and tearproof after storage. Preferably, this difference in temperature is 5° C. or less, more preferably 2° C. or less.

Possible forms of use of the styrene compound and extra vinyl monomer in polymerization C are the same as those of the styrene compound and extra vinyl monomer in polymerization A, except for the following.

In polymerization C, the extra vinyl monomer may include one or two (meth)acrylate compounds; this may help make the liquid dispersion adhesive when pressure-bonded, stable when stored, and tearproof after storage. Preferably, one (meth)acrylate compound is the only extra vinyl monomer.

In polymerizations C and B, furthermore, the starting monomers for the styrene and (meth)acrylate resins may including the same (meth)acrylate compound(s); this may help ensure the composite resin particles will easily undergo a phase transition when exposed to pressure. In other words, the styrene resin produced in polymerization C and the (meth)acrylate resin produced in polymerization B may have repeating unit(s) derived from the same (meth)acrylate compound(s) as this may help ensure the composite resin particles will easily undergo a phase transition when exposed to pressure.

In polymerizations A, B, and C, moreover, the starting monomers for the styrene, (meth)acrylate, and styrene resins may include the same (meth)acrylate compound(s); this may help ensure the composite resin particles will easily undergo a phase transition when exposed to pressure. In other words, the styrene resin produced in polymerization A, the (meth)acrylate resin produced in polymerization B, and the styrene resin produced in polymerization C may have repeating unit(s) derived from the same (meth)acrylate compound(s) as this may help ensure the composite resin particles will easily undergo a phase transition when exposed to pressure.

In polymerization C, the ratio by mass between the styrene compound and extra vinyl monomer combined and the (meth)acrylate resin in the intermediate resin particles may be between 5:95 and 40:60; this may help make the liquid dispersion adhesive when pressure-bonded, stable when stored, and tearproof after storage. Preferably, this ratio is between 10:90 and 30:70.

The styrene resin produced in polymerization A and that produced in polymerization C may have the same composition or may have different compositions. Preferably, the two styrene resins have different compositions; this may help make the liquid dispersion adhesive when pressure-bonded, stable when stored, and tearproof after storage.

The difference in the glass transition temperature of the styrene resin produced in polymerization A and that of the styrene resin produced in polymerization C is not critical. For example, it may be 10° C. or less; this may help make the liquid dispersion adhesive when pressure-bonded, stable when stored, and tearproof after storage. Preferably, this difference in glass transition temperature is 5° C. or less, more preferably 2° C. or less.

In intermediate resin particles B, the weight-average molecular weight of the resins contained may be 100,000 or more; this may help prevent the composite resin particles from flowing without applied pressure. Preferably, the weight-average molecular weight of the resins is 120,000 or more, more preferably 150,000 or more. The weight-average molecular weight of the resins in intermediate resin particles B may be 400,000 or less; this may help ensure the composite resin particles will easily undergo a phase transition when exposed to pressure. Preferably, the weight-average molecular weight of the resins is 300,000 or less, more preferably 250,000 or less.

In this exemplary embodiment, the total percentage of styrene and (meth)acrylate resins in intermediate resin particles B may be 70% by mass or more in relation to intermediate resin particles B as a whole. Preferably, this percentage is 80% by mass or more, more preferably 90% by mass or more, even more preferably 95% by mass or more, in particular 100% by mass.

Addition of Initiator

The method according to this exemplary embodiment for producing a liquid dispersion of composite resin particles includes adding a polymerization initiator to liquid dispersion B, obtained in polymerization C, to give a liquid dispersion containing composite resin particles (addition of initiator)

The polymerization initiator can be of any kind as long as it causes residual monomers to polymerize. Known photoinitiators and thermal initiators can be used.

Thermal initiators are preferred as they may help make the liquid dispersion tearproof after storage and may reduce residual monomers effectively. Peroxides are more preferred, and it is even more preferred that the polymerization initiator be a persulfate compound, in particular ammonium persulfate.

The polymerization initiator may be a water-soluble one; this may help make the liquid dispersion tearproof after storage and reduce residual monomers effectively. Water-soluble thermal initiators are preferred.

In this exemplary embodiment, being "water-soluble" means the substance dissolves in water at 25° C. to a concentration of 1% by mass or more.

The amount of initiator added may be 0.001% by mass or more and 5% by mass or less of the total mass of intermediate resin particles B in liquid dispersion B. Preferably, the amount of initiator added is 0.005% by mass or more and 2% by mass or less, more preferably 0.01% by mass or more and 0.5% by mass or less, even more preferably 0.05% by mass or more and 0.3% by mass or less.

The polymerization initiator may be added when the temperature of liquid dispersion B is higher than that of polymerization C; this may help make the liquid dispersion tearproof after storage and reduce residual monomers effectively.

The specific temperature of liquid dispersion B is not critical. As stated, the temperature of liquid dispersion B may be higher than that of polymerization C as this may help make the liquid dispersion tearproof after storage and reduce residual monomers effectively. Preferably, the difference in temperature is 2° C. or more and 20° C. or less, more preferably 3° C. or more and 10° C. or less.

The temperature of liquid dispersion B, furthermore, may be higher than the glass transition temperatures of the styrene resins by 10° C. to 40° C.; this may help make the liquid dispersion tearproof after storage and reduce residual monomers effectively. Preferably, the difference in temperature is between 10° C. and 30° C.

Changing the temperature of liquid dispersion B may be before, during, or after the addition of the polymerization initiator. Preferably, the temperature of liquid dispersion B is changed before the addition of the polymerization initiator; this may help make the liquid dispersion tearproof after storage and reduce residual monomers effectively. More preferably, the temperature of liquid dispersion B is increased before the addition of the polymerization initiator.

After the addition of the polymerization initiator, the mixture may be stirred while the temperature is held.

The length of time for which the temperature is held is not critical and is at the manufacturer's discretion. This duration may be 0.5 hours or more and 24 hours or less; this may help make the liquid dispersion tearproof after storage and reduce residual monomers effectively. Preferably, the temperature is held for 1 hour or more and 12 hours or less, more preferably 1.5 hours or more and 6 hours or less.

In the composite resin particles, the weight-average molecular weight of the resins contained may be 100,000 or more; this may help prevent the composite resin particles from flowing without applied pressure. Preferably, the weight-average molecular weight of the resins is 120,000 or more, more preferably 150,000 or more. The weight-average molecular weight of the resins in the composite resin particles may be 400,000 or less; this may help ensure the composite resin particles will easily undergo a phase transition when exposed to pressure. Preferably, the weight-average molecular weight of the resins is 300,000 or less, more preferably 250,000 or less.

In this exemplary embodiment, the total percentage of styrene and (meth)acrylate resins in the composite resin particles may be 70% by mass or more in relation to the composite resin particles as a whole. Preferably, this percentage is 80% by mass or more, more preferably 90% by mass or more, even more preferably 95% by mass or more, in particular 100% by mass.

Other Resins

The composite resin particles may contain, for example, polystyrene; and non-vinyl resins, such as epoxy, polyester, polyurethane, polyamide, cellulose, and polyether resins and modified rosin. One of these resins may be used alone, or two or more may be used in combination.

Additives

The composite resin particles may optionally contain, for example, a coloring agent (e.g., a pigment or dye), a release agent (e.g., a hydrocarbon wax; a natural wax, such as carnauba, rice, or candelilla wax; a synthesized or mineral/petroleum wax, such as montan wax; or an ester wax, such as a fatty acid ester or montanate), and/or a charge control agent.

If the manufacturer wants to produce transparent composite resin particles, the coloring agent content of the composite resin particles may be 1.0% by mass or less in relation to the composite resin particles as a whole. The lower the coloring agent content, the better for the transparency of the composite resin particles.

In the liquid dispersion of composite resin particles, the volume-average diameter of the composite resin particles may be 140 nm or more and 300 nm or less. Preferably, the volume-average diameter the composite resin particles is 150 nm or more and 280 nm or less, more preferably 160 nm or more and 250 nm or less.

The percentage of the composite resin particles in the liquid dispersion of composite resin particles is not critical. It may be 10% by mass or more and 80% by mass or less in relation to the liquid dispersion of composite resin particles as a whole. Preferably, the percentage of the composite resin particles is 20% by mass or more and 70% by mass or less, more preferably 30% by mass or more and 60% by mass or less.

In the method according to this exemplary embodiment for producing a liquid dispersion of composite resin particles, the composite resin particles produced may be pressure-responsive particles, i.e., particles that undergo a phase transition when exposed to pressure. Preferably, mathematical relation 1 is met.

$$10° C. \leq T1-T2 \qquad \text{Relation 1}$$

In relation 1, T1 is the temperature at which the particles have a viscosity of 10,000 Pa·s at a pressure of 1 MPa, and T2 is the temperature at which the particles have a viscosity of 10,000 Pa·s at a pressure of 10 MPa.

If difference in temperature (T1−T2) is 10° C. or more, the pressure-responsive resin particles may easily undergo a phase transition when exposed to pressure. T1−T2 may be 15° C. or more, preferably is 20° C. or more. (T1−T2) may be 120° C. or less; this may help prevent the pressure-responsive resin particles from flowing without applied pressure. Preferably, (T1−T2) is 100° C. or less, more preferably 80° C. or less.

Temperature T1 may be 140° C. or below. Preferably, T1 is 130° C. or below, more preferably 120° C. or below, even more preferably 115° C. or below. As for the lower limit, temperature T1 may be 80° C. or above. Preferably, T1 is 85° C. or above.

Temperature T2 may be 40° C. or above. Preferably, T2 is 50° C. or above, more preferably 60° C. or above. As for the upper limit, temperature T2 may be 85° C. or below.

Another measure of the tendency of the pressure-responsive particles to undergo a phase transition when exposed to pressure is a difference between the temperature T1 at which the particles have a viscosity of 10,000 Pa·s at a pressure of 1 MPa and the temperature T3 at which the particles have a viscosity of 10,000 Pa·s at a pressure of 4 MPa (T1−T3). Difference in temperature (T1−T3) may be 5° C. or more. When (T1−T3) is 5° C. or more, the pressure-responsive resin particles according to this exemplary embodiment may undergo a phase transition easily when exposed to pressure. Preferably, (T1−T3) is 10° C. or more.

Usually, difference in temperature (T1−T3) is 25° C. or less.

Temperature T3, at which the pressure-responsive particles have a viscosity of 10,000 Pa·s at a pressure of 4 MPa, may be 90° C. or below; this may help ensure difference in temperature (T1−T3) will be 5° C. or more. Preferably, T3 is 85° C. or below, more preferably 80° C. or below. As for the lower limit, temperature T3 may be 60° C. or above.

Temperatures T1, T2, and T3 are determined as follows.

The pressure-responsive particles are compressed into pellets. This sample in pellet form is set into a flow tester (CFT-500, Shimadzu), and its viscosity is measured at varying temperatures with a constant applied pressure of 1 MPa. In the viscosity graph obtained, temperature T1, at which the viscosity is $10^4$ Pa·s at an applied pressure of 1 MPa, is determined. Temperatures T2 and T3 are determined in the same way as T1, except that the applied pressure is changed from 1 MPa to 10 MPa and 4 MPa, respectively. Difference in temperature (T1−T2) is calculated from temperatures T1 and T2, and difference in temperature (T1−T3) is calculated from temperatures T1 and T3.

Uses of the Composite Resin Particles

In the method according to this exemplary embodiment for producing a liquid dispersion of composite resin particles, the resulting composite resin particles and liquid dispersion thereof are versatile. Examples of their uses include a pressure-sensitive adhesive, a pressure-responsive resin, and a binder resin in a toner for developing an electrostatic charge image.

Composite resin particles according to an exemplary embodiment are those produced by the method according to this exemplary embodiment for producing a liquid dispersion of composite resin particles.

A method according to an exemplary embodiment for producing a pressure-sensitive adhesive, for example, includes the method according to this exemplary embodiment for producing a liquid dispersion of composite resin particles.

A pressure-sensitive adhesive according to an exemplary embodiment contains composite resin particles produced by the method according to this exemplary embodiment for producing a liquid dispersion of composite resin particles.

A method according to an exemplary embodiment for producing a pressure-responsive resin includes the method according to this exemplary embodiment for producing a liquid dispersion of composite resin particles.

A pressure-responsive resin according to an exemplary embodiment contains composite resin particles produced by the method according to this exemplary embodiment for producing a liquid dispersion of composite resin particles or a resin produced by making the composite resin particles aggregate and coalesce together.

A method according to an exemplary embodiment for producing a toner for developing an electrostatic charge image involves the use of a liquid dispersion produced by the method according to this exemplary embodiment for producing a liquid dispersion of composite resin particles.

A toner according to an exemplary embodiment for developing an electrostatic charge image contains a resin produced by making resin particles aggregate and coalesce together. The resin particles are composite resin particles produced by the method according to this exemplary embodiment for producing a liquid dispersion of composite resin particles.

Pressure-Sensitive Adhesive

A pressure-sensitive adhesive according to an exemplary embodiment contains composite resin particles produced by the method according to the above exemplary embodiment for producing a liquid dispersion of composite resin particles.

If the pressure-sensitive adhesive according to this exemplary embodiment is a liquid composition, it may contain at least one dispersion medium.

Examples of dispersion media include water; alcohols, such as propylene glycol, 1,3-propanediol, and diethylene glycol; and other aqueous media. One of these may be used alone, or two or more may be used in combination.

If the pressure-sensitive adhesive according to this exemplary embodiment is a liquid composition, furthermore, the percentage of the composite resin particles is not critical. It may be 10% by mass or more and 80% by mass or less in relation to the pressure-sensitive adhesive as a whole.

The pressure-sensitive adhesive according to this exemplary embodiment may contain additives, such as a surfactant, a dispersion stabilizer, a viscosity modifier, a pH-adjusting agent, an antioxidant, an ultraviolet absorber, a preservative, and/or an antimold.

Cartridge

A cartridge according to an exemplary embodiment contains the composite resin particles described above or the pressure-sensitive adhesive according to the above exemplary embodiment and can be attached to and detached from an apparatus for producing printed matter. The apparatus for producing printed matter has a dispenser, a component that places the composite resin particles on a recording medium. When the cartridge is connected to the apparatus, the cartridge is connected to the dispenser by feed tubing.

The cartridge feeds the composite resin particles to the dispenser. When near empty of the composite particles therein, the cartridge is replaced.

Apparatus for Producing Printed Matter, Method for Producing Printed Matter, and Printed Matter An apparatus according to an exemplary embodiment for producing printed matter includes a dispenser and a pressure bonder. The dispenser is a component that contains the composite resin particles described above or the pressure-sensitive adhesive according to an above exemplary embodiment and places the composite resin particles on a recording medium. The pressure bonder is a component that folds the recording medium or stacks the recording medium with another and fastens the folded or stacked workpiece by pressure bonding.

Printed matter according to this exemplary embodiment is any kind of printed matter bonded using the composite resin particles described above or the pressure-sensitive adhesive according to an above exemplary embodiment.

For example, the printed matter according to this exemplary embodiment may be a folded recording medium with facing surfaces stuck together by the composite resin particles. Alternatively, it may be a stack of recording media with facing surfaces stuck together by the composite resin particles.

The dispenser includes, for example, an applicator, optionally with a fixing device. The applicator is a device that applies the composite resin particles to a recording medium, and the fixing device fixes the applied composite resin particles on the recording medium.

The pressure bonder includes, for example, a folding device or stacker and a press. The folding device folds a recording medium with the placed composite resin particles thereon, whereas the stacker is a device that stacks the recording medium with the placed composite resin particles thereon with another. The press is a device that applies pressure to the folded or stacked workpiece.

A component of the pressure bonder, the press applies pressure to the recording medium with the placed composite resin particles thereon. The pressure fluidizes the composite resin particles on the recording medium, making them adhesive.

The apparatus according to this exemplary embodiment for producing printed matter carries out a method according to this exemplary embodiment for producing printed matter. Involving the use of the composite resin particles described above or the pressure-sensitive adhesive according to an above exemplary embodiment, the method according to this exemplary embodiment for producing printed matter includes placing the composite resin particles on a recording medium (placement) and folding the recording medium or stacking the recording medium with another and fastening the folded or stacked workpiece by pressure bonding (pressure bonding).

The placement includes, for example, applying the composite resin particles to a recording medium, optionally followed by fixing the applied composite resin particles on the recording medium.

The pressure bonding includes, for example, folding the recording medium or stacking the recording medium with another and applying pressure to the folded or stacked workpiece.

The composite resin particles or pressure-sensitive adhesive may be placed over the entire surface of the recording medium or may be placed on part of it. The composite resin particles are placed on the recording medium in one or multiple layers. The layer(s) of composite resin particles may be continuous or discontinuous along the surface of the recording medium. In the layer(s) of composite resin particles, furthermore, each composite resin particle may be present isolated or may be present fused with the next ones.

In the region in which the composite resin particles (maybe transparent) are placed, their density on the recording medium is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of layer(s) of the composite resin particles (maybe transparent) on the recording medium is, for example, 0.2 μm or more and 25 μm or less, 0.4 μm or more and 20 μm or less, or 0.6 μm or more and 15 μm or less.

Examples of recording media that can be used with the apparatus according to this exemplary embodiment for producing printed matter include paper, coated paper (paper with a coating, for example of resin, on its surface), fabric, nonwoven fabric, resin film, and resin sheets. The recording medium may have an image on one or both sides.

The following describes an example of an apparatus according to this exemplary embodiment for producing printed matter. This is not the only possible form of the apparatus according to this exemplary embodiment.

FIG. 1 is a schematic diagram illustrating an example of an apparatus according to this exemplary embodiment for producing printed matter. The apparatus illustrated in FIG. 1 includes a dispenser 100 and a pressure bonder 200 downstream of the dispenser 100. The arrows indicate the direction in which the recording medium is transported.

The dispenser 100 is a device that places the pressure-sensitive adhesive described above on a recording medium P. On one or both sides of the recording medium P is an image formed beforehand.

The dispenser 100 includes an applicator 110 and a fixing device 120 downstream of the applicator 110.

The applicator 110 applies the composite resin particles M to the recording medium P. Examples of application techniques the applicator 110 can be based on include spraying, bar coating, die coating, knife coating, roller coating, reverse roll coating, gravure coating, screen printing, inkjet printing, lamination, and electrophotography. Some application techniques may involve dispersing the composite resin particles M in a dispersion medium and applying the resulting liquid composition with the applicator 110.

After the application of the composite resin particles M thereto by the applicator 110, the recording medium P is transported to the fixing device 120.

The fixing device 120 is, for example, a heater, which fixes the composite resin particles M on a passing recording medium P by heating the composite resin particles M on the record medium P with a heat source; a press, which fixes the composite resin particles M on a passing recording medium P by applying pressure to the recording medium P with a pair of pressing elements (two rollers or a belt and a roller); or a heat press, which fixes the composite resin particles M on a passing recording medium P by applying pressure to and at the same time heating the recording medium P with a pair of pressing elements (two rollers or a belt and a roller) having a heat source inside.

If the fixing device 120 has a heat source, it may heat the surface of the recording medium P to a temperature of 10° C. or above and 80° C. or below. Preferably, the surface temperature reached is 20° C. or above and 60° C. or below, more preferably 30° C. or above and 50° C. or below.

If the fixing device 120 has pressing elements, the pressure they apply to the recording medium P can be smaller than that the press 230 will apply to recording medium P2 (described later herein).

Through the dispenser 100, the recording medium P becomes recording medium P1, a form of the recording medium P with applied composite resin particles M on image(s). Recording medium P1 is transported for the pressure bonder 200.

The apparatus according to this exemplary embodiment for producing printed matter may have the dispenser 100 and pressure bonder 200 close to each other or may have them distant. If distant from each other, the dispenser 100 and the pressure bonder 200 are connected by, for example, a mechanism that transports recording medium P1 (e.g., a belt conveyer system).

The pressure bonder 200 is a component that includes a folding device 220 and a press 230. With these devices, the pressure bonder 200 folds recording medium P1 and fastens the folded workpiece by pressure bonding.

The folding device 220 folds recording medium P1 while it passes therethrough, producing recording medium P2, a folded form of the recording medium P. In making recording medium P2, recoding medium P1 may be folded in, for example, two, three, or four, or only part of it may be folded over another. Recording medium P2 has composite resin particles M on at least one of the two, or each pair of, facing surfaces, with the resin particles covering at least part of the surface(s).

The folding device 220 may have a pair of pressing elements that apply pressure to recording medium P2 (e.g., two rollers or a belt and a roller). The pressure the pressing elements apply to recording medium P2 can be smaller than that the press 230 will apply.

Instead of the folding device 220, the pressure bonder 200 may have a stacker that stacks recording medium P1 with another recording medium. The recording medium stacked with recording medium P1 can be, for example, one continuous sheet over the entire area of recording medium P1 or separate pieces on different areas of recording medium P1. The extra recording medium may have an image on one or both sides, may have no image, or may be pressure-bonded printed matter prepared beforehand.

After leaving the folding device 220 (or stacker), recording medium P2 is transported for the press 230.

The press 230 includes a pair of pressing elements (i.e., pressure rollers 231 and 232). Touching and pressing each other on their outer surface, the pressure rollers 231 and 232 apply pressure to recording medium P2 while it passes therebetween. The pair of pressure elements the press 230 has do not need to be two pressure rollers; it may be a pressure roller and a pressure belt or two pressure belts.

The pressure applied to recording medium P2 while it passes through the press 230 fluidizes the composite resin particles M on recording medium P2, making them adhesive.

The press 230 may have a heat source for heating recording medium P2 (e.g., a halogen heater) inside or may not. Even if the press 230 has no heat source inside, its internal temperature can become equal to or higher than the ambient temperature because of heating, for example of a motor the press 230 has.

As recording medium P2 passes through the press 230, its surfaces facing one another are stuck together by the fluidized composite resin particles M, giving pressure-bonded printed matter P3. In the resulting pressure-bonded printed matter P3, the two, or each pair of, facing surfaces have been stuck together partially or completely.

The finished pressure-bonded printed matter P3 is transported from the press 230.

In its first form, the pressure-bonded printed matter P3 is a folded recording medium with facing surfaces stuck together by the composite resin particles M. Pressure-bonded printed matter P3 in this form is produced using an apparatus for producing printed matter having a folding device 220.

In its second form, the pressure-bonded printed matter P3 is a stack of multiple recording media with facing surfaces stuck together by the composite resin particles M. Pressure-bonded printed matter P3 in this form is produced using an apparatus for producing printed matter having a stacker.

The apparatus according to this exemplary embodiment for producing printed matter does not need to transport recording medium P2 from the folding device 220 (or stacker) to the press 230 immediately. The apparatus according to this exemplary embodiment for producing printed matter may hold recording medium P2 that has left the folding device 220 (or stacker), wait until a predetermined quantity of recording medium P2 is held, and then transport it to the press 230.

The apparatus according to this exemplary embodiment for producing printed matter, furthermore, may have the folding device 220 (or stacker) and press 230 close to each other or may have them distant. If distant from each other, the folding device 220 (or stacker) and the press 230 are connected by, for example, a mechanism that transports recording medium P2 (e.g., a belt conveyer system).

The apparatus according to this exemplary embodiment for producing printed matter, moreover, may have a cutter that cuts the recording medium to a predetermined size. The cutter is placed between, for example, the dispenser 100 and the pressure bonder 200 to cut part of recording medium P1 with no composite resin particles M thereon; between the folding device 220 and the press 230 to cut part of recording medium P2 with no composite resin particles M thereon; or downstream of the pressure bonder 200 to cut part of the pressure-bonded printed matter P3 with no composite resin particles M thereon.

The apparatus according to this exemplary embodiment for producing printed matter does not need to be a cut-sheet one. It may place the composite resin particles on an elongated recording medium and pressure-bond it. In that case, the apparatus then cuts the resulting, elongated pressure-bonded printed matter to a predetermined size.

The apparatus according to this exemplary embodiment for producing printed matter, furthermore, may further include a component that produces a color image on the recording medium using a colorant (color image component). The color image component produces, for example, a color image of ink, by applying a colored ink by inkjet technology, or an electrophotographic color image, using a colored electrostatic charge image developer, on the recording medium.

An apparatus configured as such carries out the method according to this exemplary embodiment for producing printed matter that further includes forming a color image on the recording medium using a colorant. Specifically, the method includes forming a color image of ink, by applying a colored ink by inkjet technology, or an electrophotographic color image, using colored an electrostatic charge image developer, on the recording medium.

سheet for Producing Printed Matter and Method for Producing a Sheet for Producing Printed Matter A sheet according to an exemplary embodiment for producing printed matter has a substrate and the pressure-responsive particles according to an above exemplary embodiment on the substrate. The sheet may have a substrate and an adhesive material according to an exemplary embodiment.

The sheet according to this exemplary embodiment for producing printed matter is produced using the pressure-responsive particles according to an above exemplary embodiment. The pressure-responsive particles on the substrate may be in their original, particulate shape they have before being placed on the substrate or may not.

The configuration of the sheet according to this exemplary embodiment for producing printed matter is applied to, for example, a masking sheet, i.e., a sheet attached to a recording medium when one wants to mask information recorded on the recording medium; or a release sheet, i.e., a sheet used to form an adhesive layer on a recording medium when two recording media are stuck together.

Examples of substrates that can be used in the sheet according to this exemplary embodiment for producing printed matter include paper, coated paper (paper with a coating, for example of resin, on its surface), fabric, non-woven fabric, resin film, and a resin sheet. The substrate may have an image on one or both sides.

The sheet according to this exemplary embodiment for producing printed matter may have the pressure-responsive particles over the entire surface of the substrate or on part of it. The pressure-responsive particles are on the substrate in one or multiple layers. The layer(s) of pressure-responsive particles may be continuous or discontinuous along the surface of the substrate. In the layer(s) of pressure-responsive particles, furthermore, each pressure-responsive particle may be present isolated or may be present fused with the next ones.

In the region in which the pressure-sensitive particles are present, their density on the substrate is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The thickness of layer(s) of the pressure-responsive particles on the substrate is, for example, 0.2 μm or more and 25 μm or less, 0.4 μm or more and 20 μm or less, or 0.6 μm or more and 15 μm or less.

The sheet according to this exemplary embodiment for producing printer matter is produced using, for example, the pressure-responsive particles according to an above exemplary embodiment and by a method that includes placing the pressure-responsive particles on a substrate (placement).

The placement includes, for example, applying the pressure-responsive particles to a substrate, optionally followed by fixing the applied pressure-responsive particles on the substrate.

The application of the pressure-responsive particles to the substrate is achieved by, for example, an application technique such as spraying, bar coating, die coating, knife coating, roller coating, reverse roll coating, gravure coating, screen printing, inkjet printing, lamination, or electrophotography. Some application techniques may involve dispersing the pressure-responsive particles in a dispersion medium and applying the resulting liquid composition.

The fixation of the pressure-responsive particles on the substrate is carried out by, for example, heating the pressure-responsive particles on the substrate with a heat source; applying pressure to the substrate with the applied pressure-responsive particles thereon with a pair of pressing elements (two rollers or a belt and a roller); or applying pressure to and at the same time heating the substrate with the applied pressure-responsive particles thereon with a pair of pressing elements (two rollers or a belt and a roller) having a heat source inside.

Pressure-Responsive Resin

A method according to an exemplary embodiment for producing a pressure-responsive resin include the method according to an above exemplary embodiment for producing a liquid dispersion of composite resin particles.

A pressure-responsive resin according to this exemplary embodiment may be the composite resin particles themselves produced by the method according to an above exemplary embodiment for producing a liquid dispersion of composite resin particles or may be a resin produced by making the composite resin particles aggregate and coalesce together.

It is not critical how to make the composite resin particles aggregate and coalesce together. Known aggregation and coalescence techniques can be used.

Electrophotographic Production of Printed Matter

The following describes an exemplary embodiment in which the composite resin particles described above are applied to electrophotography. In electrophotography, the composite resin particles may be used as a binder resin in a toner for developing an electrostatic charge image.

A method according to this exemplary embodiment for producing a toner for developing an electrostatic charge image includes a resin produced by making resin particles aggregate and coalesce together. The resin particles are the composite resin particles in a liquid dispersion produced by the method according to an above exemplary embodiment for producing a liquid dispersion of composite resin particles.

Forming toner particles by making the composite resin particles described above aggregate and coalesce together is an easy way to produce a pressure-responsive toner.

In the method according to this exemplary embodiment for producing a toner for developing an electrostatic charge image, the use of a liquid dispersion produced by the method according to an above exemplary embodiment for producing a liquid dispersion of composite resin particles is the only requirement; the method may include other known operations.

Electrostatic Charge Image Developer

An electrostatic charge image developer according to this exemplary embodiment contains toner. The toner contains a resin produced by making resin particles aggregate and coalesce together, and the resin particles are composite resin particles produced by the method according to an above exemplary embodiment for producing a liquid dispersion of composite resin particles. The electrostatic charge image developer according to this exemplary embodiment may be a one-component developer, which is substantially the toner, or may be a two-component developer, which is a mixture of the toner and a carrier.

The carrier can be of any kind and can be a known one. Examples include a coated carrier, formed by a core magnetic powder and a coating resin on its surface; a magnetic powder-dispersed carrier, formed by a matrix resin and a magnetic powder dispersed therein; and a resin-impregnated carrier, which is a porous magnetic powder impregnated with resin. The particles as a component of a magnetic powder-dispersed or resin-impregnated carrier can serve as the core material; a carrier obtained by coating the surface of them with resin may also be used.

The magnetic powder can be, for example, a powder of a magnetic metal, such as iron, nickel, or cobalt; or a powder of a magnetic oxide, such as ferrite or magnetite.

The coating or matrix resin can be, for example, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin (resin having organosiloxane bonds) or its modified form, a fluoropolymer, polyester, polycarbonate, a phenolic resin, or an epoxy resin. The coating or matrix resin may contain additives, such as electrically conductive particles. Examples of electrically conductive particles include particles of metal, such as gold, silver, or copper, and particles of carbon black, titanium oxide, zinc oxide, tin oxide, barium sulfate, aluminum borate, and potassium titanate.

The resin coating of the surface of the core material can be achieved by, for example, coating the surface with a solution prepared by dissolving the coating resin in a solvent with additives (optional). The solvent can be of any kind and can be selected considering, for example, the coating resin used and suitability for coating.

Specific examples of how to provide the resin coating include dipping, i.e., immersing the core material in the solution; spraying, i.e., applying a mist of the solution onto the surface of the core material; fluidized bed coating, i.e., applying a mist of the solution to core material floated on a stream of air; and kneader-coater coating, i.e., mixing the carrier core material and the solution in a kneader-coater and removing the solvent.

If the developer is two-component, the mix ratio (by mass) between the composite resin particles and the carrier may be between 1:100 (composite resin particles:carrier) and 30:100. Preferably, the mix ratio is between 3:100 and 20:100.

Apparatus and Method for Producing Printed Matter

An electrophotography-based apparatus according to this exemplary embodiment for producing printed matter includes a dispenser and a pressure bonder. The dispenser is a component that contains a developer containing the toner described above and places the toner on a recording medium by electrophotography. The pressure bonder is a component that folds the recording medium or stacks the recording medium with another and fastens the folded or stacked workpiece by pressure bonding.

The apparatus according to this exemplary embodiment for producing printed matter carries out an electrophotographic method for producing printed matter. Involving the use of a developer containing the toner described above, the method according to this exemplary embodiment for producing printed matter includes placing the toner on a recording medium (placement) and folding the recording medium or stacking the recording medium with another and fastening the folded or stacked workpiece by pressure bonding (pressure bonding).

A component of the apparatus according to this exemplary embodiment for producing printed matter, the dispenser includes, for example:

a photoreceptor;

a component that charges the surface of the photoreceptor (charging component);

a component that creates an electrostatic charge image on the charged surface of the photoreceptor (electrostatic charge image component);

a component that contains the electrostatic charge image developer according to this exemplary embodiment and develops, using the electrostatic charge image developer, the electrostatic charge image on the surface of the photoreceptor to form an area of applied toner (developing component); and a component that transfers the applied toner on the surface of the photoreceptor to the surface of the recording medium (transfer component).

The dispenser may further include a component that fixes the applied toner on the surface of the recording medium (fixing component).

Part of the method according to this exemplary embodiment for producing printed matter, the placement includes, for example;

charging the surface of the photoreceptor;

creating an electrostatic charge image on the charged surface of the photoreceptor;

developing, using the electrostatic charge image developer according to this exemplary embodiment, the electrostatic charge image on the surface of the photoreceptor to form an area of applied toner; and transferring the applied toner on the surface of the photoreceptor to the surface of the recording medium.

The placement may further include fixing the applied toner on the surface of the recording medium.

The dispenser can be of, for example, direct-transfer type, which forms an area of applied toner to the surface of the photoreceptor and transfers it directly to the recording medium; intermediate-transfer type, which forms an area of applied toner to the surface of the photoreceptor, transfers it to the surface of an intermediate transfer body (first transfer), and then transfers the applied toner on the surface of the intermediate transfer body to the surface of the recording medium (second transfer); a type having a component that cleans the surface of the photoreceptor between the transfer of applied toner and charging (cleaning component); or a type having a static eliminator that removes static electricity from the surface of the photoreceptor by irradiating the surface with antistatic light between the transfer of applied toner and charging. If the dispenser is of intermediate-transfer type, its transfer component has, for example, an intermediate transfer body, a first transfer component, and a second transfer component. An area of applied toner formed on the surface of the photoreceptor is transferred to the surface of the intermediate transfer body by the first transfer component (first transfer), and then the applied toner on the surface of the intermediate transfer body is transferred to the surface of the recording medium by the second transfer component (second transfer).

A portion of the dispenser including the developing component may have a cartridge structure, i.e., a structure that allows the portion to be attached to and detached from the dispenser (or may be a process cartridge). An example is a process cartridge that contains the electrostatic charge image developer according to this exemplary embodiment and includes the developing component.

Another component of the apparatus according to this exemplary embodiment for producing printed matter, the pressure bonder applies pressure to the recording medium with the toner thereon. The pressure fluidizes the toner on the recording medium, making it adhesive. The pressure the pressure bonder applies to the recording medium to fluidize the toner may be 3 MPa or more and 300 MPa or less. Preferably, this pressure is 10 MPa or more and 200 MPa or less, more preferably 30 MPa or more and 150 MPa or less.

The toner may be placed over the entire surface of the recording medium or may be placed on part of it. The toner is placed on the recording medium in one or multiple layers. The layer(s) of toner may be continuous or discontinuous along the surface of the recording medium. In the layer(s) of toner, furthermore, each composite resin particle may be present isolated or may be present fused with the next ones.

In the region in which the toner is placed, its density on the recording medium is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of layer(s) of the toner (maybe transparent) on the recording medium is, for example, 0.2 μm or more and 25 μm or less, 0.4 μm or more and 20 μm or less, or 0.6 μm or more and 15 μm or less.

Examples of recording media that can be used with the apparatus according to this exemplary embodiment for producing printed matter include paper, coated paper (paper with a coating, for example of resin, on its surface), fabric, nonwoven fabric, resin film, and resin sheets. The recording medium may have an image on one or both sides.

The following describes an example of an electrophotography-based apparatus according to this exemplary embodiment for producing printed matter. This is not the only possible form of the apparatus according to this exemplary embodiment.

Figure 2:
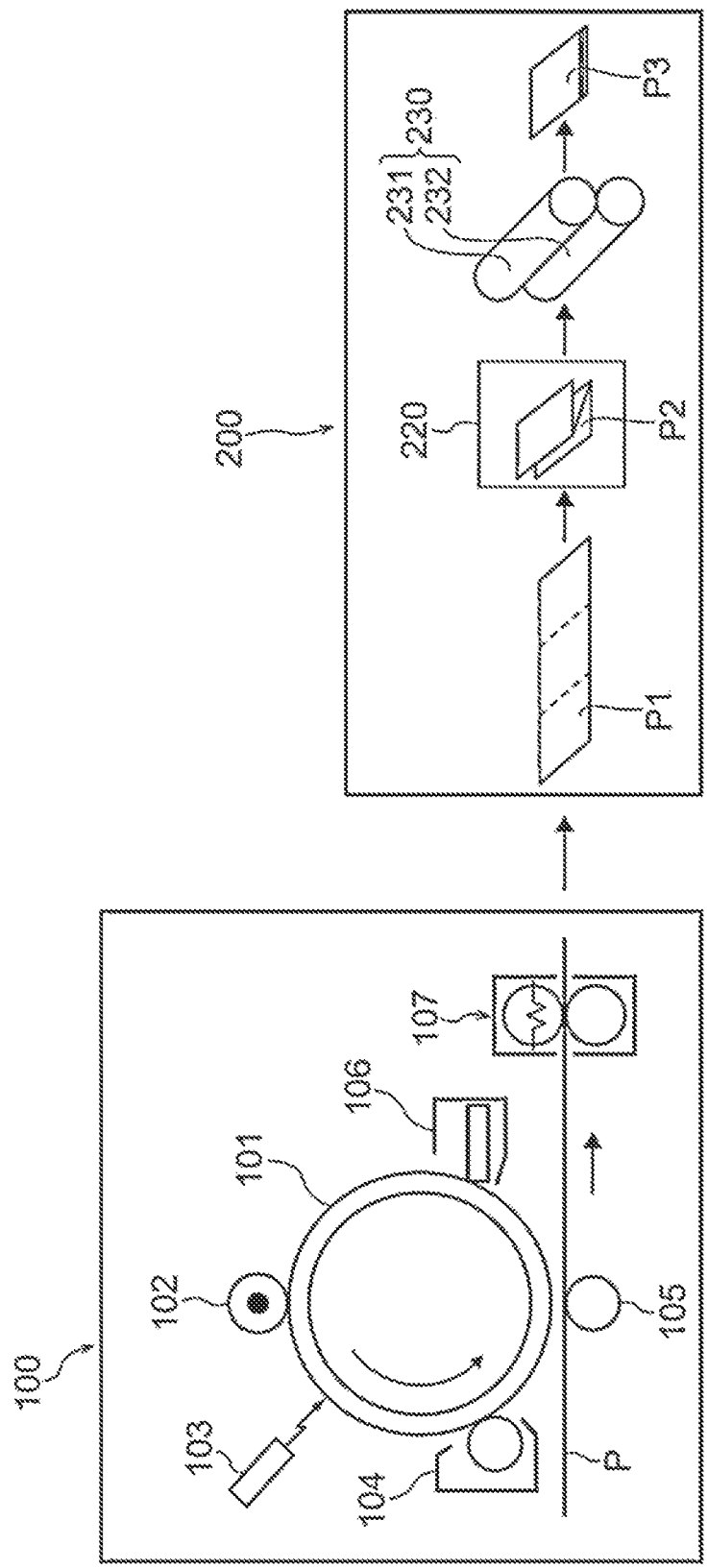
FIG. 2 is a schematic diagram illustrating another example of an apparatus according to an exemplary embodiment for producing printed matter.

FIG. 2 is a schematic diagram illustrating an example of an apparatus according to this exemplary embodiment for producing printed matter. The apparatus illustrated in FIG. 2 includes a dispenser 100 and a pressure bonder 200 downstream of the dispenser 100. The arrows indicate the direction in which the photoreceptor rotates or that in which the recording medium is transported.

The dispenser 100 is of direct-transfer type; it places the toner described above on a recording medium P by electrophotography, using a developer that contains the toner. On one or both sides of the recording medium P is an image formed beforehand.

The dispenser 100 has a photoreceptor 101. Around the photoreceptor 101 are a roller 102 that charges the surface of the photoreceptor 101 (charging roller; an example of a charging component), a device 103 that irradiates the charged surface of the photoreceptor 101 with a laser beam to create an electrostatic charge image there (light emitter; an example of an electrostatic charge image component), a device 104 that supplies toner to the electrostatic charge image to develop the electrostatic charge image (developing device; an example of a developing component), a roller 105 that transfers the developed toner to the recording medium P (transfer roller; an example of a transfer component), and a device 106 that removes residual toner off the surface of the photoreceptor 101 after transfer (photoreceptor cleaner; an example of a cleaning component), arranged in this order.

The following describes how the dispenser 100 operates to place toner on a recording medium P.

First, the charging roller 102 charges the surface of the photoreceptor 101. Onto the charged surface of the photoreceptor 101, the light emitter 103 emits a laser beam in accordance with image data sent from a controller (not illustrated). As a result, an electrostatic charge image is created on the surface of the photoreceptor 101 as a pattern that defines where the toner should be placed.

The electrostatic charge image created on the photoreceptor 101 moves to the point of development as the photoreceptor 101 rotates. At the point of development, the electrostatic charge image on the photoreceptor 101 is developed by the developing device 104, forming an area of applied toner.

Inside the developing device 104 is a developer that contains at least toner and a carrier. The toner is on a developer roller and has been triboelectrically charged as a result of being stirred with the carrier inside the developing device 104. As the surface of the photoreceptor 101 passes through the developing device 104, the toner electrostatically adheres to the electrostatic charge image on the photoreceptor 101 and develops the electrostatic charge image. The photoreceptor 101, now with applied toner thereon, then continues rotating, transporting the applied toner to the point of transfer.

On the arrival of the applied toner on the photoreceptor 101 at the point of transfer, a transfer bias is applied to the transfer roller 105. An electrostatic force acts on the applied toner in the direction from the photoreceptor 101 toward the transfer roller 105, causing it to be transferred from the photoreceptor 101 to the recording medium P.

Residual toner on the photoreceptor 101 is removed and collected at the photoreceptor cleaner 106. The photoreceptor cleaner 106 is, for example, a cleaning blade or cleaning brush. Preferably, the photoreceptor cleaner 106 is a cleaning brush; residue of the toner according to this exemplary embodiment on the surface of the photoreceptor can become fluidized and form adhesive film there when exposed to pressure, and the use of a cleaning brush may help prevent this.

With the transferred toner thereon, the recording medium P is transported to a fixing device (example of a fixing component) 107. The fixing device 107 is, for example, a pair of fixing elements (two rollers or a belt and a roller). The fixing device 107 is optional, but preferably the dispenser 100 has it; this may help prevent the toner according to this exemplary embodiment from slipping off of the recording medium P. The pressure the fixing device 107 applies to the recording medium P can be smaller than that the press 230 will apply to recording medium P2 (described later herein). Specifically, this pressure may be 0.2 MPa or more and 1 MPa or less.

The fixing device 107 may have a heat source for heating the recording medium P (e.g., a halogen heater) inside or may not. If the fixing device 107 has a heat source inside, it may heat the surface of the recording medium P to a temperature of 150° C. or above and 220° C. or below. Preferably, the surface temperature reached is 155° C. or above and 210° C. or below, more preferably 160° C. or above and 200° C. or below. Even if the fixing device 107 has no heat source inside, its internal temperature can become equal to or higher than the ambient temperature because of heating, for example of a motor the dispenser 100 has.

Through the dispenser 100, the recording medium P becomes recording medium P1, a form of the recording medium P with the toner according to this exemplary embodiment on image(s). Recording medium P1 is transported for the pressure bonder 200.

The apparatus according to this exemplary embodiment for producing printed matter may have the dispenser 100 and pressure bonder 200 close to each other or may have them distant. If distant from each other, the dispenser 100 and the pressure bonder 200 are connected by, for example, a mechanism that transports recording medium P1 (e.g., a belt conveyer system).

The pressure bonder 200 is a component that includes a folding device 220 and a press 230. With these devices, the pressure bonder 200 folds recording medium P1 and fastens the folded workpiece by pressure bonding.

The folding device 220 folds recording medium P1 while it passes therethrough, producing recording medium P2, a folded form of the recording medium P. In making recording medium P2, recoding medium P1 may be folded in, for example, two, three, or four, or only part of it may be folded over another. Recording medium P2 has toner on at least one of the two, or each pair of, facing surfaces, with the toner covering at least part of the surface(s).

The folding device 220 may have a pair of pressing elements that apply pressure to recording medium P2 (e.g., two rollers or a belt and a roller). The pressure the pressing elements apply to recording medium P2 can be smaller than that the press 230 will apply. Specifically, this pressure may be 1 MPa or more and 10 MPa or less.

Instead of the folding device 220, the pressure bonder 200 may have a stacker that stacks recording medium P1 with another recording medium. The recording medium stacked with recording medium P1 can be, for example, one continuous sheet over the entire area of recording medium P1 or separate pieces on different areas of recording medium P1. The extra recording medium may have an image on one or both sides, may have no image, or may be pressure-bonded printed matter prepared beforehand.

After leaving the folding device 220 (or stacker), recording medium P2 is transported for the press 230.

The press 230 includes a pair of pressing elements (i.e., pressure rollers 231 and 232). Touching and pressing each other on their outer surface, the pressure rollers 231 and 232 apply pressure to recording medium P2 while it passes therebetween. The pair of pressure elements the press 230 has do not need to be two pressure rollers; it may be a pressure roller and a pressure belt or two pressure belts.

The pressure applied to recording medium P2 while it passes through the press 230 fluidizes the toner on recording medium P2, making it adhesive. The pressure the press 230 applies to recording medium P2 may be 3 MPa or more and 300 MPa or less. Preferably, this pressure is 10 MPa or more and 200 MPa or less, more preferably 30 MPa or more and 150 MPa or less.

The press 230 may have a heat source for heating recording medium P2 (e.g., a halogen heater) inside or may not. If the press 230 has a heat source inside, it may heat the surface of recording medium P2 to a temperature of 30° C. or above and 120° C. or below. Preferably, the surface temperature reached is 40° C. or above and 100° C. or below, more preferably 50° C. or above and 90° C. or below. Even if the press 230 has no heat source inside, its internal temperature can become equal to or higher than the ambient temperature because of heating, for example of a motor the press 230 has.

As recording medium P2 passes through the press 230, its surfaces facing one another are stuck together by the fluidized toner, giving pressure-bonded printed matter P3. In the resulting pressure-bonded printed matter P3, the facing surfaces have been stuck together partially or completely.

The finished pressure-bonded printed matter P3 is transported from the press 230.

In its first form, the pressure-bonded printed matter P3 is a folded recording medium with facing surfaces stuck together by the toner. Pressure-bonded printed matter P3 in this form is produced using an apparatus for producing printed matter having a folding device 220.

In its second form, the pressure-bonded printed matter P3 is a stack of multiple recording media with facing surfaces stuck together by the toner. Pressure-bonded printed matter P3 in this form is produced using an apparatus for producing printed matter having a stacker.

The apparatus according to this exemplary embodiment for producing printed matter does not need to transport recording medium P2 from the folding device 220 (or stacker) to the press 230 immediately. The apparatus according to this exemplary embodiment for producing printed matter may hold recording medium P2 that has left the folding device 220 (or stacker), wait until a predetermined quantity of recording medium P2 is held, and then transport it to the press 230.

The apparatus according to this exemplary embodiment for producing printed matter may have the folding device 220 (or stacker) and press 230 close to each other or may have them distant. If distant from each other, the folding device 220 (or stacker) and the press 230 are connected by, for example, a mechanism that transports recording medium P2 (e.g., a belt conveyer system).

The apparatus according to this exemplary embodiment for producing printed matter may have a cutter that cuts the recording medium to a predetermined size. The cutter is placed between, for example, the dispenser 100 and the pressure bonder 200 to cut part of recording medium P1 with no toner thereon; between the folding device 220 and the press 230 to cut part of recording medium P2 with no toner thereon; or downstream of the pressure bonder 200 to cut part of the pressure-bonded printed matter P3 with no toner thereon.

The apparatus according to this exemplary embodiment for producing printed matter does not need to be a cut-sheet one. It may place the toner on an elongated recording medium and pressure-bond it. In that case, the apparatus then cuts the resulting, elongated pressure-bonded printed matter to a predetermined size.

The apparatus according to this exemplary embodiment for producing printed matter may further include a component that produces a color image on the recording medium by electrophotography, using a colored electrostatic charge image developer (color image component). The color image component includes, for example:

a photoreceptor;
a component that charges the surface of the photoreceptor (charging component);
a component that creates an electrostatic charge image on the charged surface of the photoreceptor (electrostatic charge image component);
a component that contains a colored electrostatic charge image developer and develops, using the colored electrostatic charge image developer, the electrostatic charge image on the surface of the photoreceptor to form a colored toner image (developing component);
a component that transfers the colored toner image on the surface of the photoreceptor to the surface of the recording medium (transfer component); and
a component that thermally fixes the colored toner image on the surface of the recording medium (thermal fixation component).

An apparatus configured as such carries out the method according to this exemplary embodiment for producing printed matter that further includes forming a color image on the recording medium by electrophotography, using a colored electrostatic charge image developer. Specifically, the formation of a color image includes:

charging the surface of the photoreceptor;
creating an electrostatic charge image on the charged surface of the photoreceptor;
developing, using a colored electrostatic charge image developer, the electrostatic charge image on the surface of the photoreceptor to form a colored toner image;
transferring the colored toner image on the surface of the photoreceptor to the surface of the recording medium; and
thermally fixing the colored toner image on the surface of the recording medium.

A component of the apparatus according to this exemplary embodiment for producing printed matter, the color image component can be of, for example, direct-transfer type, which forms a colored toner image on the surface of the photoreceptor and transfers it directly to the recording medium; intermediate-transfer type, which forms a colored toner image on the surface of the photoreceptor, transfers it to the surface of an intermediate transfer body (first transfer), and then transfers the toner image on the surface of the intermediate transfer body to the surface of the recording medium (second transfer); a type having a component that cleans the surface of the photoreceptor between the transfer of a colored toner image and charging (cleaning component); or a type having a static eliminator that removes static electricity from the surface of the photoreceptor by irradiating the surface with antistatic light between the transfer of a colored toner image and charging. If the color image component is of intermediate-transfer type, its transfer component has, for example, an intermediate transfer body, a first transfer component, and a second transfer component. A colored toner image formed on the surface of the photoreceptor is transferred to the surface of the intermediate transfer body by the first transfer component (first transfer), and then the colored toner image on the surface of the intermediate transfer body is transferred to the surface of the recording medium by the second transfer component (second transfer).

If the apparatus according to this exemplary embodiment for producing printed matter has a dispenser for a developer containing the toner described above and a color image component both of intermediate-transfer type, the dispenser and the color image component may share the same intermediate transfer body and the same second transfer component.

In the context of the apparatus according to this exemplary embodiment for producing printed matter, furthermore, the dispenser for a developer containing the toner described above and the color image component may share the same thermal fixation component.

The following describes an example of an apparatus according to this exemplary embodiment for producing printed matter, an example of one that includes a color image component. This is not the only possible form of the apparatus according to this exemplary embodiment. Some of its structural elements are described with reference to a drawing.

Figure 3:
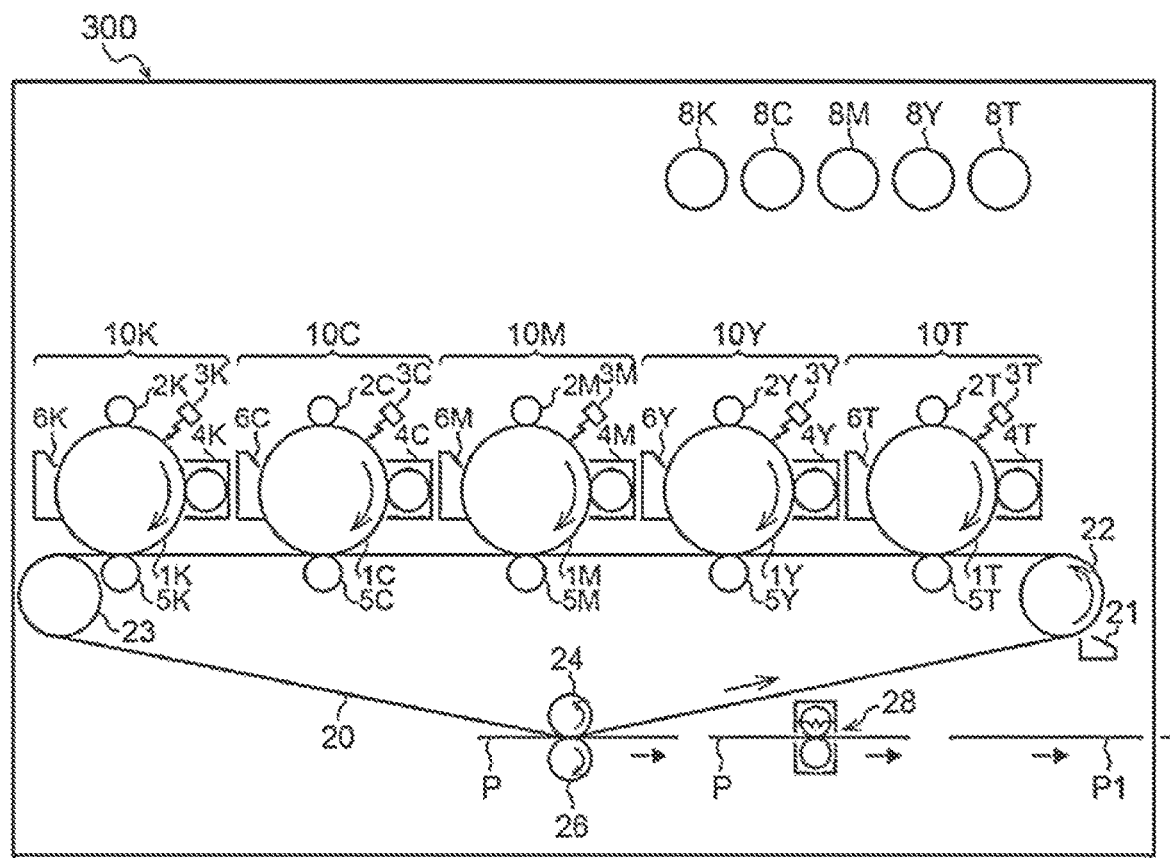
FIG. 3 is a schematic diagram illustrating another example of an apparatus according to an exemplary embodiment for producing printed matter.
Figure 3:
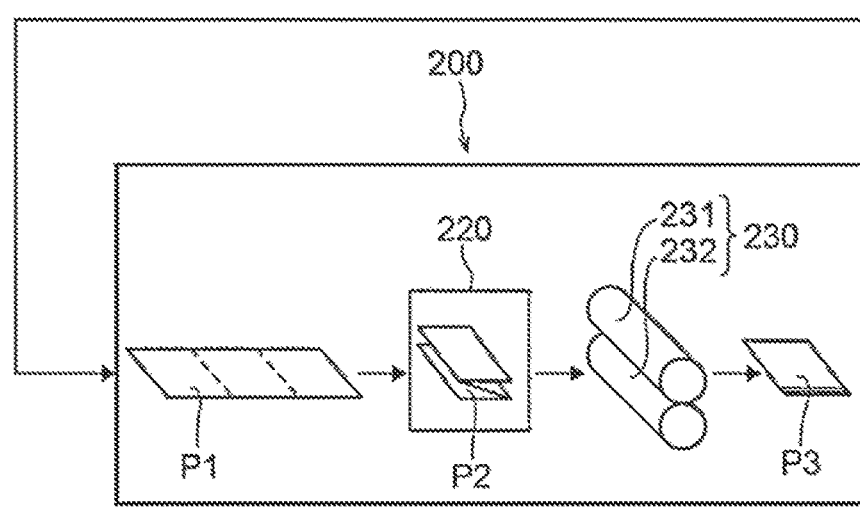

FIG. 3 is a schematic diagram illustrating an example of an electrophotography-based apparatus according to this exemplary embodiment for producing printed matter. The apparatus illustrated in FIG. 3 includes a printer 300 and a pressure bonder 200 downstream of the printer 300. The printer 300 is a one-stop component that places toner on a recording medium and produces color images at the same time.

The printer 300 is of intermediate-transfer type and has five units in tandem. The printer 300 includes a unit 10T that places the toner according to this exemplary embodiment (T) and units 10Y, 10M, 10C, and 10K that produce images in the colors of yellow (Y), magenta (M), cyan (C), and black (K), respectively. The unit 10T is the dispenser, which places the toner described above on the recording medium P using a developer containing the toner. The units 10Y, 10M, 10C, and 10K each produce a color image on the recording medium P using a developer containing colored toner. The units 10T, 10Y, 10M, 10C, and 10K are based on electrophotographic technology.

The units 10T, 10Y, 10M, 10C, and 10K are arranged in a horizontal row, spaced from one another. The units 10T, 10Y, 10M, 10C, and 10K may be process cartridges, i.e., units that can be attached to and detached from the printer 300.

Under the units 10T, 10Y, 10M, 10C, and 10K is an intermediate transfer belt (example of an intermediate transfer body) 20 extending through each of the units. The intermediate transfer belt 20 is wound over a drive roller 22, a support roller 23, and a counter roller 24, with these rollers touching the inner surface of the intermediate transfer belt 20, and runs in the direction from the unit 10T to the unit 10K. On the image-carrying side of the intermediate transfer belt 20 is a cleaner 21 for the intermediate transfer belt 20, facing the drive roller 22.

The units 10T, 10Y, 10M, 10C, and 10K have their respective developing devices (example of a developing component) 4T, 4Y, 4M, 4C, and 4K. To the developing devices 4T, 4Y, 4M, 4C, and 4K, the toner described above and yellow, magenta, cyan, and black toners, respectively, are delivered from a toner cartridge 8T and from toner cartridges 8Y, 8M, 8C, and 8K.

The units 10T, 10Y, 10M, 10C, and 10K are equivalent in structure and operation. In the following, the unit 10T, which places the toner described above on a recording medium, is described to represent the five units.

The unit 10T has a photoreceptor 1T. Around the photoreceptor 1T are a roller 2T that charges the surface of the photoreceptor 1T (charging roller; an example of a charging component), a device 3T that irradiates the charged surface of the photoreceptor 1T with a laser beam to create an electrostatic charge image there (light emitter; an example of an electrostatic charge image component), a device 4T that supplies toner to the electrostatic charge image to develop the electrostatic charge image (developing device; an example of a developing component), a roller 5T that transfers the developed toner to the intermediate transfer belt 20 (first transfer roller; an example of a first transfer component), and a device 6T that removes residual toner off the surface of the photoreceptor 1T after first transfer (photoreceptor cleaner; an example of a cleaning component), arranged in this order. The first transfer roller 5T is inside the intermediate transfer belt 20, facing the photoreceptor 1T.

The following describes how the printer 300 operates to place toner and produce color images on the recording medium P, taking the example of how the unit 10T operates.

First, the charging roller 2T charges the surface of the photoreceptor 1T. Onto the charged surface of the photoreceptor 1T, the light emitter 3T emits a laser beam in accordance with image data sent from a controller (not illustrated). As a result, an electrostatic charge image is created on the surface of the photoreceptor 1T as a pattern that defines where the toner should be placed.

The electrostatic charge image created on the photoreceptor 1T moves to the point of development as the photoreceptor 1T rotates. At the point of development, the electrostatic charge image on the photoreceptor 1T is developed by the developing device 4T, forming an area of applied toner.

Inside the developing device 4T is a developer that contains at least the toner described above and a carrier. The toner is on a developer roller and has been triboelectrically charged as a result of being stirred with the carrier inside the developing device 4T. As the surface of the photoreceptor 1T passes through the developing device 4T, the toner electrostatically adheres to the electrostatic charge image on the photoreceptor 1T and develops the electrostatic charge image. The photoreceptor 1T, now with applied toner thereon, then continues rotating, transporting the applied toner to the point of first transfer.

On the arrival of the applied toner on the photoreceptor 1T at the point of first transfer, a first transfer bias is applied to the first transfer roller 5T. An electrostatic force acts on the applied toner in the direction from the photoreceptor 1T toward the first transfer roller 5T, causing it to be transferred from the photoreceptor 1T to the intermediate transfer belt 20. Residual toner on the photoreceptor 1T is removed and collected at the photoreceptor cleaner 6T. The photoreceptor cleaner 6T is, for example, a cleaning blade or cleaning brush, preferably a cleaning brush.

The units 10Y, 10M, 10C, and 10K also operate in the same way as the unit 10T, but using developers containing colored toners. After the transfer of applied toner at the unit 10T, the intermediate transfer belt 20 passes through the units 10Y, 10M, 10C, and 10K sequentially. Toner images in the respective colors are overlaid on the intermediate transfer belt 20, completing multilayer transfer.

Now with applied toner and overlaid toner images thereon as a result of passing through the units 10T, 10Y, 10M, 10C, and 10K, the intermediate transfer belt 20 then reaches a second transfer section. The second transfer section is formed by the intermediate transfer belt 20, the counter roller 24, which touches the inner surface of the intermediate transfer belt 20, and a second transfer roller (example of a second transfer component) 26, which is on the image-carrying side of the intermediate transfer belt 20. A feeding mechanism feeds a recording medium P to the point of contact between the second transfer roller 26 and the intermediate transfer belt 20, and a second transfer bias is applied to the counter roller 24. An electrostatic force acts on the applied toner and the toner images in the direction from the intermediate transfer belt 20 toward the recording medium P, causing them to be transferred from the intermediate transfer belt 20 to the recording medium P.

The recording medium to which the applied toner and the toner images have been transferred is transported to a thermal fuser (example of a thermal fixation component) 28. The thermal fuser 28 heats the recording medium P with a heat source, such as a halogen heater. The thermal fuser 28 may heat the surface of the recording medium P to a temperature of 150° C. or above and 220° C. or below. Preferably, the surface temperature reached is 155° C. or above and 210° C. or below, more preferably 160° C. or above and 200° C. or below. As the recording medium P passes through the thermal fuser 28, the colored toner images are thermally fixed thereon.

The thermal fuser 28 may apply pressure to the recording medium P while heating it; this may help prevent the toners from slipping off of the recording medium P and may also help improve the fixation of the colored images on the recording medium P. For example, it may be a pair of fixing elements (two rollers or a belt and a roller) having a heat source inside. The pressure the thermal fuser 28 applies to the recording medium P, if it does, can be smaller than that the press 230 will apply to recording medium P2 (describe later herein). Specifically, this pressure may be 0.2 MPa or more and 1 MPa or less.

Through the printer 300, the recording medium P becomes recording medium P1, a form of the recording medium P with colored images and applied toner thereon. Recording medium P1 is transported for the pressure bonder 200.

The structure and operation of the pressure bonder 200 in FIG. 3 are not described in detail; the structure of the pressure bonder 200 can be the same as that of the pressure bonder 200 in FIG. 2.

The apparatus according to this exemplary embodiment for producing printed matter may have the printer 300 and pressure bonder 200 close to each other or may have them distant. If distant from each other, the printer 300 and the pressure bonder 200 are connected by, for example, a mechanism that transports recording medium P1 (e.g., a belt conveyer system).

The apparatus according to this exemplary embodiment for producing printed matter may have a cutter that cuts the recording medium to a predetermined size. The cutter is placed between, for example, the printer 300 and the pressure bonder 200 to cut part of recording medium P1 with no toner thereon; between the folding device 220 and the press 230 to cut part of recording medium P2 with no toner thereon; or downstream of the pressure bonder 200 to cut part of the pressure-bonded printed matter P3 with no toner thereon.

The apparatus according to this exemplary embodiment for producing printed matter does not need to be a cut-sheet one. It may produce colored images and place toner on an elongated recording medium and pressure-bond it. In that case, the apparatus then cuts the resulting, elongated pressure-bonded printed matter to a predetermined size.

Process Cartridge

The following describes a process cartridge used with an electrophotographic apparatus according to this exemplary embodiment for producing printed matter.

A process cartridge according to this exemplary embodiment includes a component that contains the electrostatic charge image developer according to this exemplary embodiment and develops, using the electrostatic charge image developer, an electrostatic charge image created on the surface of a photoreceptor to form an area of applied toner thereon (developing component). The process cartridge can be attached to and detached from an apparatus for producing printed matter.

Besides the developing component, the process cartridge according to this exemplary embodiment may optionally have at least one selected from a photoreceptor, a charging component, an electrostatic charge image component, a transfer component, etc.

An exemplary embodiment of a process cartridge is one having a housing and components held together therein. Inside the housing, a photoreceptor is surrounded by a charging roller (example of a charging component), a developing device (example of a developing component, and a photoreceptor cleaner (example of a cleaning component). The housing has an opening that allows light in. The housing also has rails, which serve as a guide when the process cartridge is attached to an apparatus for producing printed matter.

The image forming apparatus illustrated in FIG. 1 has toner cartridges 8Y, 8M, 8C, and 8K that can be attached to and detached from it. The developing devices 4Y, 4M, 4C, and 4K are connected to their corresponding toner cartridges (or the toner cartridges for their respective colors) by tubing (toner feed tubing; not illustrated). When there is little toner in a toner cartridge, this toner cartridge is replaced.

Liquid Dispersion of Composite Resin Particles

A liquid dispersion according to an exemplary embodiment of composite resin particles contains composite resin particles and a dispersion medium in which the composite resin particles are dispersed. The composite resin particles contain at least a (meth)acrylate resin and a styrene resin inside and have at least a styrene resin on their surface. The (meth)acrylate resin is a polymer of monomer(s) including at least one (meth)acrylate compound, the styrene resin inside is a polymer of monomers including at least one styrene compound and at least one extra vinyl monomer, and the styrene resin on the surface is a polymer of monomers including at least one styrene compound and at least one extra vinyl monomer. The residual monomer content of the composite resin particles is 1,200 ppm or less. In the composite resin particles as a whole, the ratio by mass between the styrene and (meth)acrylate resins is between 80:20 and 20:80. There is a difference of 30° C. or more between the lowest and highest glass transition temperatures of the composite resin particles.

The liquid dispersion according to this exemplary embodiment of composite resin particles may be one produced by the method according to an above exemplary embodiment for producing a liquid dispersion of composite resin particles.

The liquid dispersion according to this exemplary embodiment of composite resin particles, furthermore, may be suitable for use as a pressure-sensitive adhesive.

Possible forms of the liquid dispersion according to this exemplary embodiment of composite resin particles are the same as those of a liquid dispersion produced by the method according to an exemplary embodiment for producing a liquid dispersion of composite resin particles, described above, except for the following.

The residual monomer content of the composite resin particles is 1,200 ppm or less. It may be 800 ppm or less; this may help make the liquid dispersion adhesive when pressure-bonded, stable when stored, and tearproof after storage. Preferably, the residual monomer content is 500 ppm or less.

EXAMPLES

The following describes the above exemplary embodiments in more specific terms, in further detail, by providing examples and comparative examples. The above exemplary embodiments, however, are by no means limited to these Examples. "Parts" and "%" used to describe the quantity of something are by mass unless stated otherwise.

Example 1

Preparation of Liquid Dispersion St1 of Styrene Resin Particles

Styrene (St): 370 parts
n-butyl acrylate (BA): 115 parts
Acrylic acid (AA): 15 parts
Dodecanethiol: 7.5 parts
These materials are mixed together and dissolved.

The resulting monomer solution is dispersed in a solution of 8 parts of an anionic surfactant (DOWFAX 2A1, Dow Chemical) in 205 parts of deionized water, giving an emulsion.

A solution of 2.2 parts of the same anionic surfactant in 462 parts of deionized water is put into a polymerization flask, a flask equipped with a stirrer, a thermometer, a reflux condenser, and a nitrogen gas tube. The solution is heated to 73° C. while being stirred, and kept at this temperature.

A solution of 3 parts of ammonium persulfate in 21 parts of deionized water is added dropwise to the polymerization flask over 15 minutes using a metering pump. Then the emulsion is added dropwise over 160 minutes using a metering pump.

While gentle stirring is continued, the polymerization flask is kept at 75° C. for 3 hours and then allowed to cool to room temperature (25° C.; the same applies hereinafter).

This gives a liquid dispersion of styrene resin particles (liquid dispersion St1). The volume-average diameter (D50v) of the particles is 175 nm, the weight-average molecular weight by GPC (UV detection) and glass transition temperature of the resin are 45,000 and 53° C., respectively, and the solids content of the liquid dispersion is 42%.

Preparation of Liquid Dispersion SMS1 of Composite Resin Particles

Liquid dispersion St1 of styrene resin particles: 500 parts (on a solids basis)
n-butyl acrylate (BA): 250 parts
2-Ethylhexyl acrylate (2EHA): 150 parts
Deionized water: 982 parts These materials are put into a polymerization flask, stirred at 25° C. for 1 hour, and then heated to 70° C. A solution of 2.5 parts of ammonium persulfate in 75 parts of deionized water is added dropwise to the polymerization flask over 60 minutes using a metering pump. While gentle stirring is continued, the polymerization flask is kept at 70° C. for 3 hours.

A monomer solution prepared by mixing together and dissolving 85 parts of styrene and 15 parts of n-butyl acrylate is added dropwise over 30 minutes. The mixture is allowed to stand for 3 hours and then heated to 75° C. A solution of 1.3 parts of ammonium persulfate in 60 parts of deionized water is added dropwise to the polymerization flask over 10 minutes using a metering pump. The mixture is kept at that temperature for 3 hours and then allowed to cool to room temperature.

This gives a liquid dispersion of composite resin particles (liquid dispersion SMS1; pressure-sensitive adhesive). The volume-average diameter (D50v) of the particles is 220 nm, the weight-average molecular weight by GPC (UV detection) of the resins is 210,000, and the solids content of the liquid dispersion is 32%.

Comparative Example 1

A liquid dispersion of composite resin particles (pressure-sensitive adhesive) is obtained as in Example 1, except that the monomer solution prepared by mixing together and dissolving 85 parts of styrene and 15 parts of n-butyl acrylate is not added, and no ammonium persulfate is added after heating to 75° C.

Examples 2, 3, and 8 to 15 and Comparative Examples 2 and 3

A liquid dispersion of composite resin particles (pressure-sensitive adhesive) is obtained as in Example 1, except that the ratio between raw-material monomers in polymerizations A, B, and C are changed as in Tables 1-1 and 1-2. The total amount of resins is constant.

Preparation of Liquid Dispersions St2 to St4 of Styrene Resin Particles

Liquid dispersions of styrene resin particles are prepared in the same way as liquid dispersion St1 of styrene resin particles, with the proviso that the monomers are changed as in Tables 1-1 and 1-2 (liquid dispersions St2 to St4).

In Tables 1-1 and 1-2, the names of monomers are abbreviated as follows.

Styrene, St; n-butyl acrylate, BA; 2-ethylhexyl acrylate, 2EHA; ethyl acrylate, EA; acrylic acid, AA; hexyl acrylate, HA; propyl acrylate, PA Examples 4 to 7

Preparation of Liquid Dispersions SMS4 to SMS7 of Composite Resin Particles

Liquid dispersions of composite resin particles are prepared in the same way as liquid dispersion SMS1 of composite resin particles, with the proviso that the polymerization initiator, its amount, and the target temperature after its addition are changed as in Tables 1-1 and 1-2 (liquid dispersions SMS4 to SMS7).

Testing for Adhesiveness

Using an electrophotographic printer, an image of characters is printed on a sheet of paper. The printed matter is cut into a size equivalent to two postcards, coated with the pressure-sensitive adhesive to a density of 8 g/m² using a bar coater and dried, and then folded in two. The folded printed matter is compressed by passing it through a sealer (Pressle multi 2, Toppan Forms Co., Ltd.; gap, 25). After being left overnight, the compressed workpiece is cut to a width of 15 mm, and the cut piece is subjected to a 90° peel test. By the measured peel strength (unit, N/15 mm), adhesiveness is graded.

The criteria for grading are as follows.

A: ≥0.8 N/15 mm
B: >0.4 N/15 mm and <0.8 N/15 mm
C: ≤0.4 N/15 mm

If the grade is A or B, the liquid dispersion is adhesive enough. Grade A is better.

Stability when Stored

The liquid dispersion of composite resin particles is stored in a tightly sealed chamber at 30° C. for a month, and the particle size distribution is measured using an LS Coulter. If aggregates form, the measured size distribution by volume has two peaks, with one of them in the "oversized powder" range. The criteria for grading, therefore, are as follows.

A: One peak; the size distribution remains unchanged from baseline.

B: Two peaks, with one of them in the oversized powder range; stirring deletes the peak for oversized powder.

C: Two peaks, with one of them in the oversized powder range; stirring does not delete the peak for oversized powder.

If the grade is A or B, the liquid dispersion is stable when stored. Grade A is better.

Tearproofness after Storage

As in the testing for adhesiveness, a printed sheet of paper folded with applied pressure-sensitive adhesive inside is compressed by passing it through a sealer. The compressed workpiece is stored in a chamber at 30° C. and 90% RH for a week, and then the sticking portions are separated manually. The surfaces are examined for tearing of paper, and tearproofness after storage is graded according to the following criteria.

A: No tearing

B: Minor tearing of paper is observed (the image is intact)

C: Significant tearing of paper is observed (the damage involves where the image is printed)

If the grade is A or B, the liquid dispersion is tearproof after storage. Grade A is better.

Residual Monomer Content

Gas chromatograph: GC 2010 (Shimadzu Corporation)
Headspace sampler: TurboMatrix 40 (PerkinElmer)
Using these, the residual monomer content is measured under the following conditions.
Sample volume: 2 mL (on a solids basis)
Carrier gas: Nitrogen
Vaporizing chamber: temperature, 220° C.; pressure, 100.0 kPa; total flow rate, 50 mL/min
Purge flow rate: 3.0 mL/min
Detector: A flame ionization detector (FID; temperature, 260° C.)
Column temperature: Rise to 250° C. over 30 minutes The residual amount of each monomer is determined based on calibration curves. The criteria for grading are as follows.

A: Total residual monomer content is <800 ppm

B: Total residual monomer content is ≥800 ppm and 1,200 ppm

C: Total residual monomer content is >1,200 ppm

If the grade is A or B, the residual monomer content is small enough. Grade A is better.

A summary of the test results is presented in Tables 1-1 and 1-2.

TABLE 1-1

| | Styrene resin from polymerization A | | | Composite resin particles | | | | |
|---|---|---|---|---|---|---|---|---|
| | Liquid dispersion of St resin particles | Ratio by mass between monomers | Tg (° C.) | Liquid dispersion of composite resin particles | Ratio by mass of monomers in polymerization A/B/C | Ratio by mass of St resins/Ac resin | Lowest Tg (° C.) | Highest Tg (° C.) |
| Example 1 | St1 | St/BA/AA = 74/23/3 | 53 | SMS1 | 50/40/10 | 60/40 | −50 | 65 |
| Example 2 | St1 | St/BA/AA = 74/23/3 | 53 | SMS2 | 67/23/10 | 77/23 | −50 | 65 |
| Example 3 | St1 | St/BA/AA = 74/23/3 | 53 | SMS3 | 17/78/5 | 22/78 | −50 | 65 |
| Example 4 | St1 | St/BA/AA = 74/23/3 | 53 | SMS4 | 50/40/10 | 60/40 | −50 | 65 |
| Example 5 | St1 | St/BA/AA = 74/23/3 | 53 | SMS5 | 50/40/10 | 60/40 | −50 | 65 |
| Example 6 | St1 | St/BA/AA = 74/23/3 | 53 | SMS6 | 50/40/10 | 60/40 | −50 | 65 |
| Example 7 | St1 | St/BA/AA = 74/23/3 | 53 | SMS7 | 50/40/10 | 60/40 | −50 | 65 |
| Example 8 | St1 | St/BA/AA = 74/23/3 | 53 | SMS8 | 50/40/10 | 60/40 | −46 | 66 |
| Example 9 | St1 | St/BA/AA = 74/23/3 | 53 | SMS9 | 50/40/10 | 60/40 | −52 | 64 |
| Example 10 | St1 | St/BA/AA = 74/23/3 | 53 | SMS10 | 50/40/10 | 60/40 | −55 | 65 |
| Example 11 | St1 | St/BA/AA = 74/23/3 | 53 | SMS11 | 50/40/10 | 60/40 | −50 | 65 |
| Example 12 | St2 | St/2EHA/AA = 74/23/3 | 55 | SMS12 | 50/40/10 | 60/40 | −50 | 65 |
| Example 13 | St3 | St/EA/AA = 64/33/3 | 55 | SMS13 | 50/40/10 | 60/40 | −30 | 55 |
| Example 14 | St4 | St/BA/AA = 85/10/5 | 56 | SMS14 | 50/40/10 | 60/40 | −50 | 65 |
| Example 15 | St1 | St/BA/AA = 74/23/3 | 53 | SMS15 | 50/40/10 | 60/40 | −50 | 75 |
| Comparative Example 1 | St1 | St/BA/AA = 74/23/3 | 53 | SMS16 | 60/40/0 | 60/40 | −50 | 53 |
| Comparative Example 2 | St1 | St/BA/AA = 74/23/3 | 53 | SMS17 | 73/17/10 | 83/17 | −50 | 53 |
| Comparative Example 3 | St1 | St/BA/AA = 74/23/3 | 53 | SMS18 | 6/84/10 | 16/84 | −50 | 53 |

TABLE 1-2

| | (Meth)acrylate resin from polymerization B Ratio by mass between monomers | Styrene resin from polymerization C Ratio by mass between monomers | Addition of initiator | | | Adhesiveness | Stability when stored | Tearproofness after storage | Residual monomer content |
|---|---|---|---|---|---|---|---|---|---|
| | | | Polymerization initiator | Amount added (% by mass) | Temperature (° C.) | | | | |
| Example 1 | 2EHA/BA = 38/62 | St/BA = 85/15 | $(NH_4)_2S_2O_8$ | 0.13 | 75 | A | A | A | A |
| Example 2 | 2EHA/BA = 38/62 | St/BA = 85/15 | $(NH_4)_2S_2O_8$ | 0.13 | 75 | B | A | A | A |
| Example 3 | 2EHA/BA = 38/62 | St/BA = 85/15 | $(NH_4)_2S_2O_8$ | 0.13 | 75 | A | B | B | A |
| Example 4 | 2EHA/BA = 38/62 | St/BA = 85/15 | Benzoyl peroxide | 0.16 | 75 | A | A | A | A |

TABLE 1-2-continued

|  | (Meth)acrylate resin from polymerization B Ratio by mass between monomers | Styrene resin from polymerization C Ratio by mass between monomers | Addition of initiator | | | Adhesiveness | Stability when stored | Tearproofness after storage | Residual monomer content |
|---|---|---|---|---|---|---|---|---|---|
|  |  |  | Polymerization initiator | Amount added (% by mass) | Temperature (° C.) |  |  |  |  |
| Example 5 | 2EHA/BA = 38/62 | St/BA = 85/15 | (NH$_4$)$_2$S$_2$O$_8$ | 0.04 | 75 | A | A | A | B |
| Example 6 | 2EHA/BA = 38/62 | St/BA = 85/15 | (NH$_4$)$_2$S$_2$O$_8$ | 0.40 | 75 | A | A | B | A |
| Example 7 | 2EHA/BA = 38/62 | St/BA = 85/15 | (NH$_4$)$_2$S$_2$O$_8$ | 0.13 | 70 | A | A | A | B |
| Example 8 | 2EHA/PA = 38/62 | St/PA = 80/20 | (NH$_4$)$_2$S$_2$O$_8$ | 0.13 | 75 | A | A | A | A |
| Example 9 | 2EHA/HA = 38/62 | St/HA = 88/12 | (NH$_4$)$_2$S$_2$O$_8$ | 0.13 | 75 | A | A | A | A |
| Example 10 | 2EHA/BA = 25/75 | St/BA = 85/15 | (NH$_4$)$_2$S$_2$O$_8$ | 0.13 | 75 | A | A | A | A |
| Example 11 | 2EHA/BA = 75/25 | St/BA = 85/15 | (NH$_4$)$_2$S$_2$O$_8$ | 0.13 | 75 | A | A | A | A |
| Example 12 | 2EHA/BA = 38/62 | St/BA = 85/15 | (NH$_4$)$_2$S$_2$O$_8$ | 0.40 | 75 | A | A | A | A |
| Example 13 | 2EHA/BA = 38/62 | St/EA = 70/30 | (NH$_4$)$_2$S$_2$O$_8$ | 0.40 | 75 | A | A | A | A |
| Example 14 | 2EHA/BA = 38/62 | St/BA = 85/15 | (NH$_4$)$_2$S$_2$O$_8$ | 0.40 | 75 | A | A | A | A |
| Example 15 | 2EHA/BA = 38/62 | St/BA = 90/10 | (NH$_4$)$_2$S$_2$O$_8$ | 0.40 | 75 | B | A | A | A |
| Comparative Example 1 | 2EHA/BA = 38/62 | — | None | NA | — | A | A | C | C |
| Comparative Example 2 | 2EHA/BA = 38/62 | St/BA = 85/15 | (NH$_4$)$_2$S$_2$O$_8$ | 0.13 | 75 | C | A | A | A |
| Comparative Example 3 | 2EHA/BA = 38/62 | St/BA = 85/15 | (NH$_4$)$_2$S$_2$O$_8$ | 0.13 | 75 | B | C | A | A |

In Tables 1-1 and 1-2, "Ac resin" represents the (meth) acrylate resin, and "St resins" represents the styrene resins.

As can be seen from these data, the liquid dispersions of Examples are superior to those of Comparative Examples in adhesiveness and stability when stored. The residual monomer content is also smaller in the liquid dispersions of Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a liquid dispersion of composite resin particles, the method comprising:
   polymerizing a styrene compound and an extra vinyl monomer to give a styrene resin;
   polymerizing a (meth)acrylate compound in the presence of the styrene resin to give intermediate resin particles A, which are resin particles containing the styrene resin and a (meth)acrylate resin;
   polymerizing a styrene compound and an extra vinyl monomer in the presence of intermediate resin particles A to give liquid dispersion B, which is a liquid dispersion containing intermediate resin particles B; and
   adding a polymerization initiator to liquid dispersion B to give a liquid dispersion of composite resin particles, wherein:
   in the composite resin particles as a whole, a ratio by mass between the styrene and (meth)acrylate resins is between 80:20 and 20:80; and
   there is a difference of 30° C. or more between lowest and highest glass transition temperatures of the composite resin particles.

2. The method according to claim 1 for producing a liquid dispersion of composite resin particles, wherein a ratio by mass between the styrene compound and extra vinyl monomer combined and the (meth)acrylate resin in intermediate resin particles A is between 5:95 and 40:60.

3. The method according to claim 1 for producing a liquid dispersion of composite resin particles, wherein the polymerization initiator is a water-soluble polymerization initiator.

4. The method according to claim 3 for producing a liquid dispersion of composite resin particles, wherein the polymerization initiator is a water-soluble peroxide.

5. The method according to claim 1 for producing a liquid dispersion of composite resin particles, wherein the polymerization initiator is added to a concentration of 0.01% by mass or more and 0.5% by mass or less of a total mass of intermediate resin particles B in liquid dispersion B.

6. The method according to claim 5 for producing a liquid dispersion of composite resin particles, wherein the polymerization initiator is added to a concentration of 0.05% by mass or more and 0.3% by mass or less of the total mass of intermediate resin particles B in liquid dispersion B.

7. The method according to claim 1 for producing a liquid dispersion of composite resin particles, wherein liquid dispersion B is heated to a temperature higher than a temperature of the polymerization of a styrene resin in the presence of intermediate resin particles A.

8. The method according to claim 1 for producing a liquid dispersion of composite resin particles, wherein the (meth)acrylate resin in the composite resin particles has a glass transition temperature of −30° C. or below.

9. The method according to claim 1 for producing a liquid dispersion of composite resin particles, wherein the styrene resin in the composite resin particles has a glass transition temperature of 30° C. or above.

10. A method for producing a pressure-sensitive adhesive, the method comprising the method according to claim 1 for producing a liquid dispersion of composite resin particles.

11. A method for producing a pressure-responsive resin, the method comprising the method according to claim 1 for producing a liquid dispersion of composite resin particles.

12. A method for producing a toner for developing an electrostatic charge image, the method comprising a resin produced by making resin particles aggregate and coalesce together, the resin particles being the composite resin particles in a liquid dispersion produced by the method according to claim 1 for producing a liquid dispersion of composite resin particles.

13. A liquid dispersion of composite resin particles, the liquid dispersion comprising:
- composite resin particles; and
- a dispersion medium in which the composite resin particles are dispersed, the composite resin particles containing at least a (meth)acrylate resin and a styrene resin inside and having at least a styrene resin on a surface thereof, the (meth)acrylate resin being a polymer of one or more monomers including a (meth)acrylate compound, the styrene resin inside being a polymer of monomers including a styrene compound and an extra vinyl monomer, and the styrene resin on the surface being a polymer of monomers including a styrene compound and an extra vinyl monomer, wherein:
- residual monomer content of the composite resin particles is 1,200 ppm or less;
- in the composite resin particles as a whole, a ratio by mass between the styrene and (meth)acrylate resins is between 80:20 and 20:80; and
- there is a difference of 30° C. or more between lowest and highest glass transition temperatures of the composite resin particles.

14. The liquid dispersion according to claim 13 of composite resin particles, wherein the liquid dispersion is a pressure-sensitive adhesive.

\* \* \* \* \*